United States Patent
Karino et al.

(10) Patent No.: US 7,443,787 B2
(45) Date of Patent: Oct. 28, 2008

(54) CLUSTER SYSTEM, CLUSTER MEMBER, AND FAILURE RECOVERY METHOD AND PROGRAM THEREOF

(75) Inventors: Shuichi Karino, Tokyo (JP); Masahiro Jibiki, Tokyo (JP); Kazuya Suzuki, Tokyo (JP)

(73) Assignee: NEC Corporation (JP)

( * ) Notice: Subject to any disclaimer, the term of this patent is extended or adjusted under 35 U.S.C. 154(b) by 605 days.

(21) Appl. No.: 11/016,484

(22) Filed: Dec. 17, 2004

(65) Prior Publication Data

US 2005/0135343 A1  Jun. 23, 2005

(30) Foreign Application Priority Data

Dec. 17, 2003 (JP) .............................. 2003-419005

(51) Int. Cl.
H04J 1/16 (2006.01)
H04J 3/14 (2006.01)

(52) U.S. Cl. ...................................... 370/218; 370/216
(58) Field of Classification Search ................. 370/216, 370/217, 218, 219, 220; 714/100, 1, 2
See application file for complete search history.

(56) References Cited

U.S. PATENT DOCUMENTS

2002/0124013 A1* 9/2002 Loy et al. .................... 707/204
2005/0228630 A1* 10/2005 Tseng et al. .................. 703/19
2006/0098583 A1* 5/2006 Baker et al. .................. 370/252
2006/0212671 A1* 9/2006 Todd ........................... 711/165

FOREIGN PATENT DOCUMENTS

WO  PCT/US99/24156  10/1999
WO  PCT/US99/24406  10/1999

* cited by examiner

Primary Examiner—Ajit Patel
(74) Attorney, Agent, or Firm—Ostrolenk, Faber, Gerb & Soffen, LLP

(57) ABSTRACT

Distribution processing control unit determines a main processing range and a sub-processing range whose charges are taken by a cluster member to which the unit belongs. Among packets multicast to a cluster system, a filter hands over packets matching with the main processing range and the sub-processing range to a session processing unit. The session processing unit conducts session processing (including processing of updating session information stored in a holding unit). Thereafter, when the packet matches with the main processing range, the session processing unit hands the packet over to a packet forwarding unit and when the packet matches with the sub-processing range, abandons the packet. When a cluster member in charge of main processing of a packet whose sub-processing is taken charge of by the cluster member in question develops a failure, a failure recovery unit changes the sub-processing range to the main processing range.

14 Claims, 18 Drawing Sheets

| MAIN PROCESSING RANGE | m f i |
|---|---|
| SUB-PROCESSING RANGE | |
| PRIORITY 1 | b f 1, i |
| PRIORITY 2 | b f 2, i |
| ⋮ | ⋮ |
| PRIORITY P | b f P, i |

| MAIN PROCESSING RANGE | m f i |
|---|---|
| FORMER MAIN PROCESSING RANGE | m f i' |
| SUB-PROCESSING RANGE | |
| PRIORITY 1 | b f 1, i' |
| ⋮ | ⋮ |
| PRIORITY P | b f P, i' |
| FORMER SUB-PROCESSING RANGE | |
| PRIORITY 1 | b f 1, i |
| ⋮ | ⋮ |
| PRIORITY P | b f P, i |

| NUMBER | IDENTIFIER | MAIN PROCESSING RANGE | SUB-PROCESSING RANGE FOR EACH PRIORITY | | |
|---|---|---|---|---|---|
| | | | 1 | ..... | P |
| 1 | ID1 | mf1 | bf1, 1 | | bfP, 1 |
| 2 | ID2 | mf2 | bf1, 2 | | bfP, 2 |
| . | . | . | . | | . |
| . | . | . | . | | . |
| . | . | . | . | ..... | . |
| i | IDi | mfi | bf1, i | | bfP, i |
| . | . | . | . | | . |
| . | . | . | . | | . |
| n | IDn | mfn | bf1, n | | bfP, n | ns a plurality of cluster members, wherein
CLUSTER SYSTEM, CLUSTER MEMBER, AND FAILURE RECOVERY METHOD AND PROGRAM THEREOF

BACKGROUND OF THE INVENTION

1. Field of the Invention

The present invention relates to a cluster system functioning as a router which forwards an IP packet and, more particularly, a cluster system which is capable of conducting failure recovery processing without exchanging session information among cluster members.

2. Description of the Related Art

Routers placed in an IP network include devices which conduct processing while referring to information of a higher layer of IP layers. Among such devices are a firewall device for use in preventing unauthorized access or the like and a VPN gateway device which terminates IPsec tunnel.

These devices need to identify a session of a higher layer to which a passing packet belongs and process the packet according to a state of the identified session. Because every time a packet passes, these devices conduct identification of a session and reference/updating of its state, the volume of calculation required for the processing will be enormous. Therefore, the technique (router cluster) has been developed which decentralizes loads with a plurality of devices provided.

One of router clusters which decentralize loads is, for example, that having a structure as shown in FIG. 20. The router cluster shown in the figure includes a plurality of router devices 101 to 10n each having a session processing unit, and a packet assignment device 110 placed preceding to the router devices. The packet assignment device 110 assigns externally applied packets to any of the routers 100 to 10n according to predetermined load decentralization rules to realize load decentralization.

The router cluster shown in FIG. 20, however, has a problem that load centralizes on the packet assignment device 110 and a problem that a failure developing in the packet assignment device 110 paralyzes the entire system.

Under these circumstances, proposed for solving these problems is such a router cluster as shown in FIG. 21 (see e.g. PCT International Application No. 2003-517221, PCT International Application No. 2003-518338).

The conventional router cluster shown in FIG. 21 includes one master router device 200 and a plurality of router devices (slave router devices) 201 to 20n. Each of the router devices 200 to 20n has a session processing unit and a traffic distribution filter.

IP packets (denoted simply as a packet in some cases) from an neighbor node 210 to the router cluster are received by all the router devices 200 to 20n by multicast by a data link layer protocol. The traffic distribution filter in each of the router devices 200 to 20n passes or abandons an IP packet multicast on a data link 220 according to traffic distribution rules.

Here, traffic distribution rules of the traffic distribution filter provided in each of the router devices 200 to 20n satisfy the following conditions.

The same packet never passes through traffic distribution filters in a plurality of router devices.

Each packet passes through a traffic distribution filter in any of the router devices without fail.

Traffic distribution rules of the traffic distribution filters in the router devices 201 to 20n are set by the master router device 200, which device recognizes what kinds of traffic distribution rules are set in the traffic distribution filters in other router devices 201 to 20n to set traffic distribution rules such that loads are evenly decentralized to the respective router devices 201 to 20n. The master router device 200 is also internally provided with a traffic distribution filter which processes a packet not meeting the traffic distribution rules. The master router device 200 generates new traffic distribution rules from session information of a processed packet and sets the rules at the traffic distribution filters of other router devices 201 to 20n. When the master router device 200 develops a failure, any one of other router devices 201 to 20n operates as a master router device.

The session processing unit in each of the router devices 200 to 20n, with reference to its internally set session processing rules and its session state, processes a packet passing through the packet distribution filter to abandon or forward the same.

The session processing rules of the session processing unit in each of the router devices 201 to 20n are set by the master router device 200. The respective router devices 200 to 20n including the master router device 200 exchange session information indicative of their own states of sessions with each other. Exchange of the session information is conducted at fixed time intervals and each of the router devices 200 to 20n holds session processing rules of other router devices and an exchanged latest session state of other router device. This accordingly enables, when any of the router devices 201 to 20n develops a failure, the master router device 200 to conduct processing of determining a device which replaces the device having the failure and making the determined device take over processing rules set at the router device having the failure and its session state. When the master router device 200 develops a failure, this also enables other router device to take over the processing of the master router device 200. Thus, the router cluster shown in FIG. 21 enables automatic recovery when any of the router devices 200 to 20n forming the router cluster develops a failure.

The conventional router cluster shown in FIG. 21 has the following shortcomings. That is, because a session state of each of the router devices 201 to 20n is transmitted to the master router device 200 at fixed intervals, there may be a difference between session states of other router devices 201 to 20n recognized by the master router device 200 and a session state held by each of the router devices 201 to 20n in some cases. Even when automatic failover is conducted by a replacement device prepared, this difference might result in processing a packet which can not be originally processed or in failing to process a packet which can be processed. For eliminating the difference, shortening session information exchanging time intervals will increase the volume of communication required for exchanging session information to increase loads on information exchange. An increase in the number of router devices also increases communication loads. As a result, conventional router clusters fail to realize an increase in the number of router devices and reduction in failover time at the same time to have a great disadvantage in scalability.

SUMMARY OF THE INVENTION

Accordingly, the object of the present invention is to enable failure recovery processing without exchanging session information among cluster members.

According to the first aspect of the invention, a cluster system formed of a plurality of cluster members, wherein each the cluster member, with respect to a packet included in a main processing range indicative of a range of main processing assigned to the cluster member or a sub-processing range indicative of a range of sub-processing among packets applied to the cluster system, executes session processing including processing of recording and updating session information indicative of a state of a session of the packet, and when a cluster member in charge of main processing of a packet whose sub-processing is assigned to the cluster member in question develops a failure, takes over the main processing of the packet of the cluster member under failure by using the recorded session information.

In the preferred construction, the main processing range and the sub-processing range are determined according to a predetermined range determination rule, and among the packets applied to the cluster system, with respect to a packet matching with the main processing range, the session processing and packet forwarding processing are conducted and with respect to a packet matching with the sub-processing range, the session processing is conducted.

According to another aspect of the invention, a cluster system formed of a plurality of cluster members, wherein each the cluster member comprises a traffic distribution filter which passes, among packets applied to the cluster system, a packet included in a main processing range indicative of a range of main processing assigned to the cluster member in question or a sub-processing range indicative of a range of sub-processing, a session information holding unit in which session information indicative of a state of a session of the packet is stored, a session processing unit which executes, with respect to a packet included in the main processing range or the sub-processing range among packets passing through the traffic distribution filter, session processing including processing of updating session information of the packet stored in the session information holding unit, a packet forwarding unit which conducts processing of forwarding a packet output from the session processing unit, and a failure recovery unit which, when a cluster member in charge of main processing of a packet whose sub-processing is assigned to by the cluster member in question develops a failure, changes the sub-processing range to a main processing range. In another preferred construction, The cluster system comprises a distribution processing control unit which determines a main processing range indicative of a range of main processing of which the cluster member in question is in charge and a sub-processing range indicative of a range of sub-processing based on a predetermined range determination rule and the number of cluster members forming the cluster system, wherein the session processing unit, with respect to a packet matching with the main processing range among packets applied to the cluster system, executes session processing including processing of updating session information of the packet stored in the session information holding unit, as well as executing packet output processing and with respect to a packet matching with the sub-processing range, executes session processing including processing of updating session information of the packet stored in the session information holding unit, as well as executing packet abandonment processing.

In the preferred construction, the distribution processing control unit, when other cluster member develops a failure and when a new cluster member is added to the cluster system, determines new main processing range and sub-processing range based on the range determination rule and the number of cluster members to make the main processing range and the sub-processing range used so far be a former main processing range and a former sub-processing range, the traffic distribution filter passes, among packets applied to the cluster system, a packet matching with the new main processing range, the new sub-processing range, the former main processing range or the former sub-processing range, and the session processing unit, among packets passing through the traffic distribution filter, with respect to a packet matching with the new main processing range, on condition that the packet is a packet which requests set-up of a session or that session information of the packet is stored in the session information holding unit, executes session processing including processing of updating the session information of the packet stored in the session information holding unit, as well as executing packet output processing, with respect to a packet matching only with the former main processing range, abandons the packet when the packet is a packet which requests set-up of a session and otherwise, on condition that session information of the packet is stored in the session information holding unit, executes session processing including processing of updating the session information of the packet stored in the session information holding unit, as well as executing packet output processing, with respect to a packet matching only with the new sub-processing range, on condition that the packet is a packet which requests set-up of a session or that session information of the packet is stored in the session information holding unit, executes session processing including processing of updating the session information of the packet stored in the session information holding unit, as well as executing packet abandonment processing, and with respect to a packet matching only with the former sub-processing range, abandons the packet when the packet is a packet which requests set-up of a session and otherwise, on condition that session information of the packet is stored in the session information holding unit, executes session processing including processing of updating the session information of the packet stored in the session information holding unit, as well as executing packet abandonment processing.

In another preferred construction, among packets passing through the traffic distribution filter, with respect to a packet matching with both the former sub-processing range and the sub-processing range, when the packet is a packet which requests set-up of a session, the session processing unit executes session processing including processing of updating session information of the packet stored in the session information holding unit, as well as executing packet abandonment processing and otherwise, on condition that the session information of the packet is stored in the session information holding unit, executes session processing including processing of updating the session information of the packet stored in the session information holding unit, as well as executing packet output processing.

In another preferred construction, each the cluster member comprising a cluster member list in which an identifier of a cluster member in the cluster system is stored, an active/inactive monitoring timer for each cluster member, and an advertising message processing unit which transmits an advertising message containing an identifier of the cluster member in question to other cluster member at predetermined intervals and when receiving an advertising message from other cluster member, resets the active/inactive monitoring timer corresponding to a cluster member as a transmission source of the advertising message, and the distribution processing control unit, when time-out occurs in any of the active/inactive monitoring timers, recognizes that a cluster member corresponding to the time-out active/inactive monitoring timer develops a failure.

In another preferred construction, when an identifier in an advertising message received by the advertising message processing unit is not contained in the cluster member list, the distribution processing control unit recognizes that the cluster member of the identifier is added.

According to another aspect of the invention, a cluster member which, among packets applied to a cluster system having the cluster member in question as a component, a packet included in a main processing range indicative of a range of main processing assigned to the cluster member in question or a sub-processing range indicative of a range of sub-processing, executes session processing including processing of recording and updating session information indicative of a state of a session of the packet, and when a cluster member in charge of main processing of a packet whose sub-processing is assigned to by the cluster member in question develops a failure, takes over the main processing of the packet of the cluster member under failure by using the recorded session information.

In the preferred construction, The cluster member, which determines the main processing range and the sub-processing range according to a predetermined range determination rule, and among the packets applied to the cluster system, with respect to a packet matching with the main processing range, conducts the session processing and packet forwarding processing and with respect to a packet-matching with the sub-processing range, conducts the session processing.

According to another aspect of the invention, a failure recovery method of a cluster system formed of a plurality of cluster members, wherein each the cluster member, among packets applied to the cluster system, with respect to a packet included in a main processing range indicative of a range of main processing assigned to the cluster member or a sub-processing range indicative of a range of sub-processing, executes session processing including processing of recording and updating session information indicative of a state of a session of the packet, and when a cluster member in charge of main processing of a packet whose sub-processing is assigned to by the cluster member in question develops a failure, takes over the main processing of the packet of the cluster member under failure by using the recorded session information.

In the preferred construction, The failure recovery method, wherein the main processing range indicative of a range of main processing of which the cluster member in question is in charge and the sub-processing range indicative of a range of sub-processing are determined based on a predetermined range determination rule, among packets applied to the cluster system, with respect to a packet matching with the main processing range, executes session processing including processing of recording and updating session information indicative of a state of a session to which the packet belongs and packet forwarding processing, and with respect to a packet matching with the determined sub-processing range, executes session processing including processing of recording and updating session information indicative of a state of a session to which the packet belongs.

According to another aspect of the invention, a program for making a computer function as a cluster member, which causes the computer to function as a means which, among packets applied to a cluster system having the cluster member in question as a component, with respect to a packet matching with a main processing range indicative of a range of main processing of which the cluster member in question takes charge or with a sub-processing range indicative of a range of sub-processing, executes session processing including processing of recording and updating session information indicative of a state of a session to which the packet belongs and when a cluster member in charge of main processing of a packet whose sub-processing is taken charge of by the cluster member in question develops a failure, takes over the main processing of the packet of which the cluster member developing a failure takes charge by using the recorded session information.

In the preferred construction, The program, which makes the computer function as a means which determines the main processing range indicative of a range of main processing of which the cluster member in question is in charge and the sub-processing range indicative of a range of sub-processing based on a predetermined range determination rule, among packets applied to the cluster system, with respect to a packet matching with the main processing range, executes session processing including processing of recording and updating session information indicative of a state of a session to which the packet belongs and packet forwarding processing, and with respect to a packet matching with the determined sub-processing range, executes session processing including processing of recording and updating session information indicative of a state of a session to which the packet belongs.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a diagram showing an example of contents of a range holding unit 121;

FIG. 4 is a diagram showing an example of contents of the range holding unit 121;

FIG. 5 is a diagram showing an example of contents of a cluster member list 172;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Next, embodiments of the present invention will be described in detail with reference to the drawings.

Description of Structure of Embodiment

Figure 1:
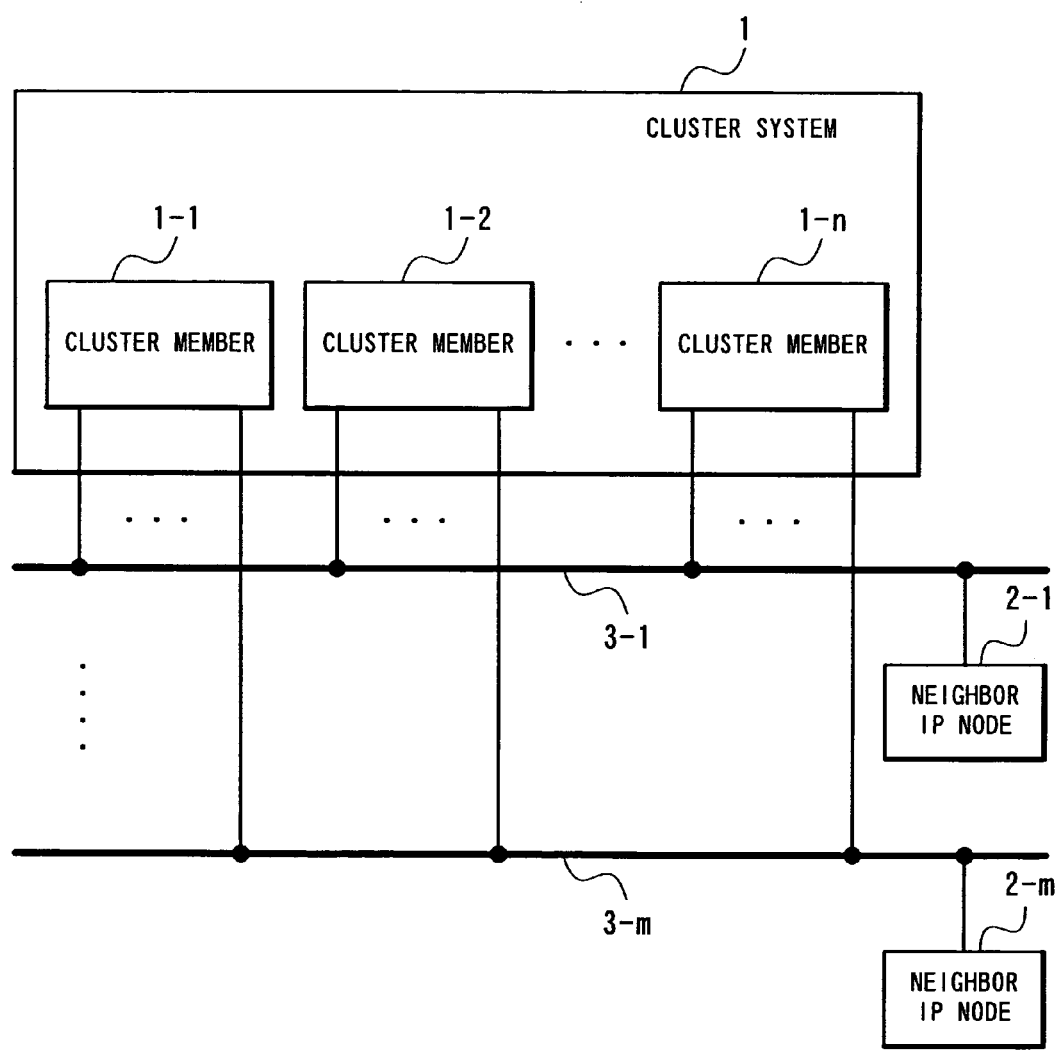
FIG. 1 is a block diagram showing an entire structure of an embodiment according to the present invention.

FIG. 1 is a block diagram showing an example of a structure of one embodiment of a cluster system according to the present invention. As shown in the figure, a cluster system 1 of the present embodiment includes a number n (a plurality) of cluster members 1-1 to 1-$n$ which are connected to neighbor IP nodes 2-1 to 2-$m$ through data links 3-1 to 3-$m$, respectively.

Figure 2:
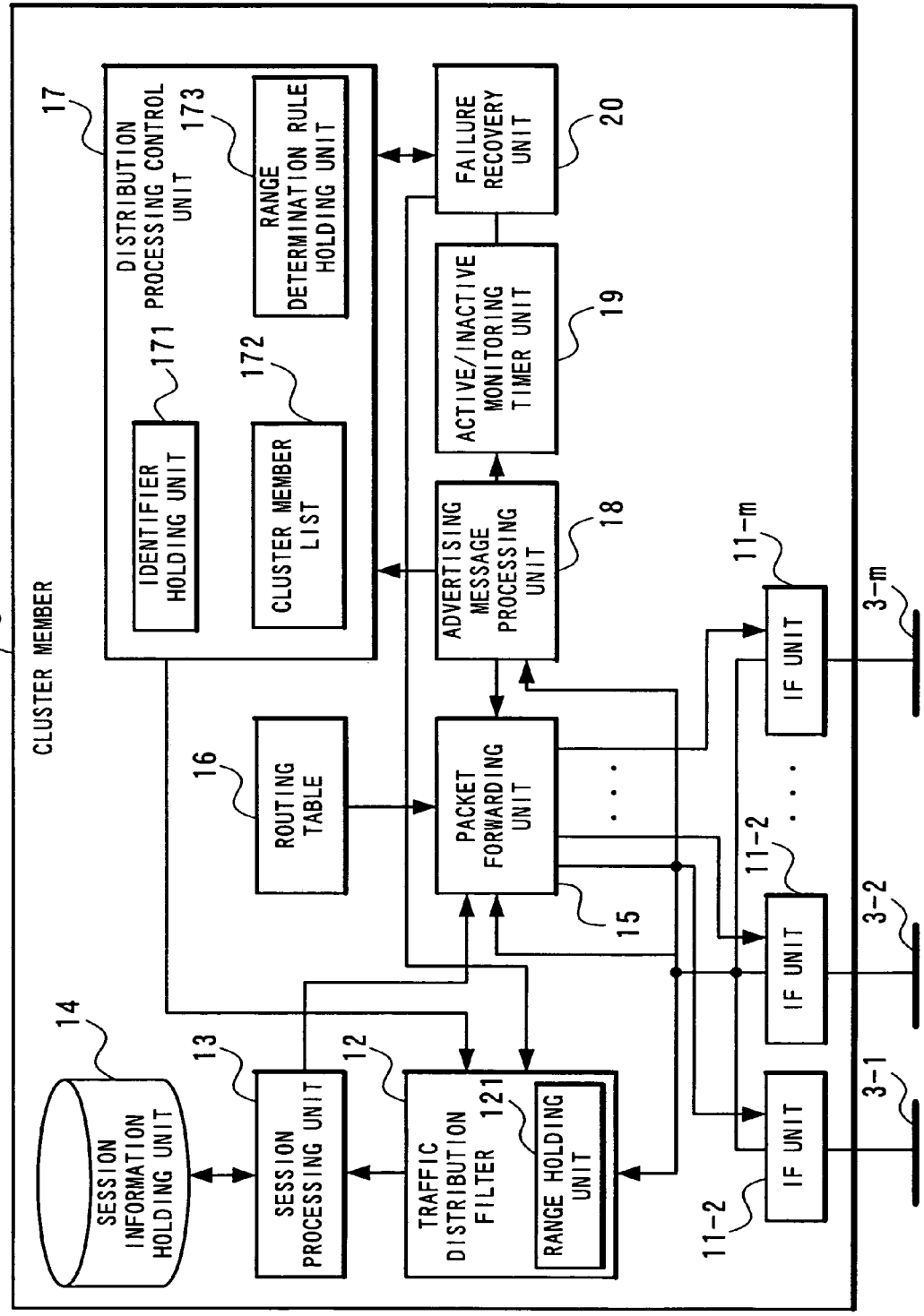
FIG. 2 is a block diagram showing an example of a structure of a cluster member 1-$i$.

FIG. 2 is a block diagram showing an example of a structure of the cluster member 1-$i$ ($1 \leq i \leq n$).

Each cluster member 1-$i$ includes interface units (IF units) 11-1 to 11-$m$ for the respective data links 3-1 to 3-$m$, a traffic distribution filter 12, a session processing unit 13, a session information holding unit 14, a packet forwarding unit 15, a routing table 16, a distribution processing control unit 17, an advertising message processing unit 18, an active/inactive monitoring timer unit 19 and a failure recovery unit 20.

The interface unit 11-$j$ ($1 \leq j \leq m$) has a function of sending a packet forwarded from the packet forwarding unit 15 and an advertising message to the data link 3-$j$ and a function of receiving a packet which is sent through the data link 3-$j$ and contains an IP address (address for cluster) inherent to the cluster system 1 as a destination, a packet (packet used by an individual cluster member for controlling) which contains an IP address (individual member address) inherent to its own cluster member 1-$i$ as a destination, a packet containing a predetermined data link multicast address corresponding to the above-described cluster address as a destination and an advertising message from other cluster member.

The traffic distribution filter 12 includes a range holding unit 121. Stored in the range holding unit 121 are a range (main processing range) of traffic of which main processing is currently taken charge by its own cluster member 1-$i$, a range (former main processing range) of traffic of which main processing was taken charge by the same in the past, a range (sub-processing range) of traffic of which sub-processing is currently taken charge by the same and a range (former sub-processing range) of traffic of which sub-processing was taken charge by the same in the past.

Then, when the interface unit 11-$j$ receives a packet with a data link multicast address as a destination, the traffic distribution filter 12 determines whether the packet should be passed (be forwarded to the session processing unit 13) or abandon the same based on each of the above-described processing ranges. The former main processing range and the former sub-processing range may not be stored in the range holding unit 121 in some cases.

FIGS. 3 and 4 show examples of contents of the range holding unit 121. The example illustrated in FIG. 3 shows that packets matching with a main processing range mfi and sub-processing ranges bf1,i to bfp,i will be made to pass and the other packets will be abandoned. The example illustrated in FIG. 4 shows that packets matching with a main processing range mfi', a former main processing range mfi, sub-processing ranges bf1,i' to bfP,i' and former sub-processing ranges bf1,i to bfP,i will be made to pass and the other packets will be abandoned.

Only the difference between the main processing and the sub-processing, which will be cleared in later description, is that a packet will be output toward a transmission path or abandoned at the packet forwarding unit 15, and the remaining part of the processing is the same.

The session processing unit 13 conducts session processing with respect to a packet which has passed through the traffic distribution filter 12. In this session processing, conducted are processing of identifying a session to which a packet belongs, processing of updating/deleting session information indicative of a session state held in the session information holding unit 14, processing (conducted at the time of setting up a session) of registering new session information at the session information holding unit 14 and processing of abandoning an unauthorized packet based on header information and session information of a packet.

Session here represents a virtual communication path provided by an expansion protocol and a higher layer protocol of an IP and includes, for example, TCP connection and IP sec Security Association. Session state represents inherent information held for each of these sessions and in a case of TCP connection, the information includes a state of the connection, a sequence number and an acknowledgement number. In a case of IP sec SA, the information includes a parameter of the SA defined by RFC2401.

The packet forwarding unit 15 has a function of determining a transmission path of a packet forwarded from the session processing unit 13 and a packet received by the interface unit 11-$j$ whose destination is other than a data link multicast address based on the contents of the routing table 16 and the destination of the above-described packet and forwarding the packet to a subsequent hop node.

The active/inactive monitoring timer unit 19 is provided with an active/inactive monitoring timer (not shown) for each of the cluster members 1-1 to 1-$n$ forming the cluster system 1. Each active/inactive monitoring timer enters a time-out state after a lapse of a predetermined time Tout after resetting.

The advertising message processing unit 18 has a function of transmitting an advertising message to other cluster members in the cluster system 1 at intervals of predetermined time Ts (Ts<Tout), a function of, upon receiving an advertising message from other cluster member 1-$k$ ($1 \leq k \leq n$), resetting an active/inactive monitoring timer for the cluster member 1-$k$ provided in the active/inactive monitoring timer unit 19 and a function of, upon detecting addition of a new cluster member based on a received advertising message, outputting a new member addition instruction to the distribution processing control unit 17.

The failure recovery unit 20 has a function of monitoring a state of the active/inactive monitoring timer for each of the cluster members 1-1 to 1-n provided in the active/inactive monitoring timer unit 19 all the time and detecting a cluster member which develops a failure, a function of, upon detecting an active/inactive monitoring timer which enters the time-out state (detecting a cluster member which develops a failure), giving to the distribution processing control unit 17 a time-out notification containing an identifier of a cluster member having a failure and a function of determining whether it is necessary to take over main processing that the cluster member having the failure has been conducting and when it is necessary, rewriting the contents of the range holding unit 121 in the traffic distribution filter 12.

The distribution processing control unit 17 includes an identifier holding unit 171, a cluster member list 172 and a range determination rule holding unit 173.

In the identifier holding unit 171, an identifier (e.g. IDi) inherent to its own cluster member 1-i is stored.

Set at the cluster member list 172 are a number indicative of a position, in the cluster member list 172, of each of the cluster members 1-1 to 1-n forming the cluster system 1, an identifier, a range of the main processing (main processing range) whose charge is taken of at present and a range of the sub-processing (sub-processing range) whose charge is taken of at present.

FIG. 5 shows one example of the cluster member list 172. The example illustrated in FIG. 5 shows that the cluster member 1-i whose number is "i" and whose identifier is "IDi" is in charge of the main processing for a packet matching with the main processing range mfi and the sub-processings whose priorities are "1" to "P" for a packet matching with the sub-processing ranges bf1,i to bfP,i. Here, P can be an arbitrary value (integer) as long as it satisfies $1 \leq P \leq (n-1)$.

Stored in the range determination rule holding unit 173 are a main processing range determination rule for determining main processing ranges mf1 to mfn whose charges should be taken of by the respective cluster members 1-1 to 1-n forming the cluster system 1 and a sub-processing range determination rule for determining sub-processing ranges bf1,1 to bfP,n whose charges should be taken of by the respective cluster members 1-1 to 1-n.

The main processing ranges mf1 to mfn which are determined by the main processing range determination rule and whose charges should be taken of by the respective cluster members 1-1 to 1-n should not overlap with each other and cover all the traffic to be processed. Assuming, for example, that all the traffic to be processed is T and an empty set is ϕ, the main processing range determination rule should be able to determine the main processing ranges mf1 to mfn satisfying the following expressions (1) and (2):

$$mf1 \cup mf2 \cup \ldots \cup mfn = T \quad (1)$$

$$mf1 \cap mf2 \cap \ldots \cap mfn = \phi \quad (2)$$

Possible main processing range determination rule satisfying such conditions will be, for example, as follows.

A main processing range determination rule having the main processing ranges mf1 to mfn of the cluster members 1-1 to 1-n with the numbers "1" to "n" as "0" to "n−1", respectively. Here, the main processing ranges mf1 to mfn ("0" to "n−1") indicate a remainder obtained when with respect to an IP transmission source address and an IP destination address of a packet, commutative operation (e.g. addition or multiplication of both addresses) is conducted and the operation result is divided by the number "n" of clusters. The main processing range determination rule is not limited thereto but be any one that can determine a main processing range satisfying the above-described expressions (1) and (2).

In addition, the sub-processing ranges bfP,1 to bfP,n determined by the sub-processing range determination rule, whose priority is P and whose charges are taken of by the respective cluster members 1-1 to 1-n should not overlap with each other and cover all the traffic T to be processed. In addition, in each cluster member, the main processing range mfi whose charge is taken of by the cluster member 1-i and the sub-processing ranges bf1,i to bfP,i having the priorities "1" to "P" whose charges are taken by the cluster member 1-i should not overlap with each other. In other words, the sub-processing range determination rule should be able to determine the sub-processing ranges bfP,1 to bfP,n which satisfy the following expressions (3) to (5):

$$bfP,1 \cup bfP,2 \cup \ldots \cup bfP,n = T \quad (3)$$

$$bfP,1 \cap bfP,2 \cap \ldots \cap bfP,n = \phi \quad (4)$$

$$mfi \cap bf1,i \cap bf2,i \cap \ldots \cap bfP,i \quad (5)$$

The distribution processing control unit 17 has a function of, when a new member addition instruction is applied from the advertising message processing unit 18 or when a time-out notification is applied from the failure recovery unit 20, determining a main processing range and a sub-processing range of each of the cluster members 1-1 to 1-n according to the main processing range determination rule and the sub-processing determination rule stored in the range determination rule holding unit 173, a function of updating the contents of the cluster member list 172 and a function of updating the contents of the range holding unit 121 in the traffic distribution filter 12.

When the cluster member 1-i, which can be realized by a computer, is realized by a computer, arrangement will be made as follows. Prepare a disk, a semiconductor memory or other recording medium which records a program for a cluster member. The computer reads the above-described program to control its own operation, thereby realizing the interface units 11-1 to 11-m, the traffic distribution filter 12, the session processing unit 13, the packet forwarding unit 15, the routing table 16, the distribution processing control unit 17, the advertising message processing unit 18, the active/inactive monitoring timer unit 19 and the failure recovery unit 20.

Description of Operation of Embodiment

Next, operation of thus structured cluster system according to the present embodiment will be described in detail.

[Processing of Receiving Packet Having Data Link Multicast Address as Destination]

First, description will be made of processing of a packet sent from the neighbor IP node 2-a ($1 \leq a \leq m$) with the cluster system 1 as a subsequent hop. With respect to a packet with a cluster address of the cluster system 1 as a subsequent hop, the neighbor IP node 2-a transmits the packet directed to a data link multicast address corresponding to the above-described cluster address.

Figure 6:
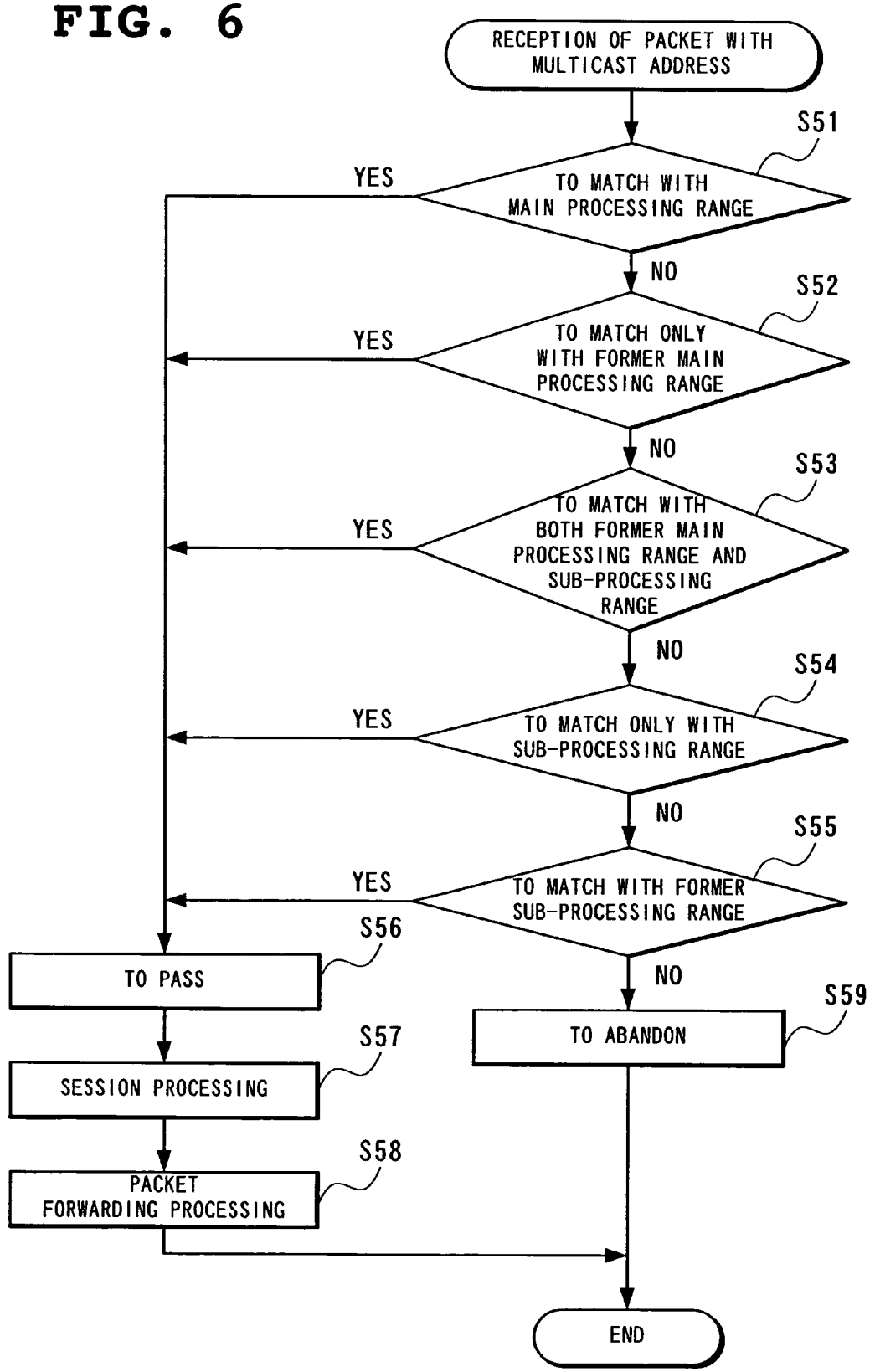
FIG. 6 is a flow chart showing an example of processing conducted when receiving a packet by a multicast address.

Upon receiving the above multicast packet, each of the cluster members 1-1 to 1-n conducts processing shown in the flow chart of FIG. 6.

The traffic distribution filter 12 in the cluster member 1-i, upon receiving the multicast packet through the interface unit 11-a, first checks whether the packet matches with the main processing range (Step S51). Then, when the packet matches with the main processing range, add a "main processing range" of each kind of match to the packet and hand the obtained packet to the session processing unit 13 (Step S56).

On the other hand, when the packet fails to match with the main processing range, check whether the packet matches only with a former main processing range, or whether the packet matches both with the former main processing range and a sub-processing range, or whether the packet matches only with the sub-processing range or whether the packet matches with a former sub-processing range (Steps S52 to S55).

When the packet matches only with the former main processing range, add a "former main processing range" of each kind of match to the packet and forward the obtained packet to the session processing unit 13 ("YES" at Step S52; S56).

When the packet matches with both the former main processing range and the sub-processing range, add "former main processing range, sub-processing range" of each kind of match to the packet and hand the obtained packet over to the session processing unit 13 ("YES" at Step S53; S56).

When the packet matches only with the sub-processing range, add a "sub-processing range" of each kind of match to the packet and forward the obtained packet to the session processing unit 13 ("YES" at Step S54; S56).

When the packet matches with the former sub-processing range, add a "former sub-processing range" of each kind of match to the packet and forward the obtained packet to the session processing unit 13 ("YES" at Step S55; S56).

When the packet matches with none of the ranges, abandon the packet ("NO" at Step S55; S59). When neither the former main processing range nor the former sub-processing range is stored in the range holding unit 121, the packet matches neither with the former main processing range nor with the former sub-processing range.

When receiving the packet with each kind of match added from the traffic distribution filter 12, the session processing unit 13 conducts session processing (Step S57). The session processing conducted at Step S57 will be detailed with reference to FIGS. 7 and 8.

When the packet with the "main processing range" of each kind of match added is forwarded from the traffic distribution filter 12 ("YES" at Step S601 in FIG. 7), the session processing unit 13 determines whether the packet requires set-up of a session or not (Step S602).

Then, when the packet requests set-up of a session, register, at the session information holding unit 14, session information of a session to which the above-described packet belongs, as well as processing the packet (Steps S603 and S604).

At Step S604, conduct processing such as abandonment of an authorized packet (hand a packet which is not abandoned over to the packet forwarding unit 15).

On the other hand, when the packet is not one that requests set-up of a session ("NO" at Step S602), check whether session information of the session to which the above-described packet belongs exists in the session information holding unit 14 based on header information of the packet (Step S605).

Then, when the information fails to exist (when its own cluster member fails to conduct processing of setting up the session to which the above-described packet belongs), abandon the packet (Step S606) and when the same exists (when its own cluster member conducts processing of setting up the session to which the above-described packet belongs), update the session information, as well as processing the packet (Steps S603 and S604). When the packet is one that requests end of a session, conduct processing of deleting the session information, which is stored in the session information holding unit 14, of the session to which the packet belongs at Step SS603.

When the packet with the "former main processing range" of each kind of match added is handed over from the traffic distribution filter 12 ("YES" at Step S607), determine whether the packet requests set-up of a session or not (Step S608).

Then, when the packet is one that requests set-up of a session, abandon the packet (Step S609) and otherwise, check whether the session information of the session to which the packet belongs is stored in the session information holding unit 14 (Step S610).

When the relevant session information fails to exist, abandon the packet (Step S609) and when the same exists, update the relevant session information stored in the session information holding unit 14, as well as conducting processing of abandoning an unauthorized packet or the like (Steps S611 and S612).

When the packet with the "sub-processing range" of each kind of match added is handed over from the traffic distribution filter 12 ("YES" at Step S701 in FIG. 8), the session processing unit 13 first determines whether the packet requests set-up of a session or not (Step S702).

Then, when the packet requests set-up of a session, register the session information of the above-described packet at the session information holding unit 14, as well as abandoning the packet (Steps S703 and S704).

On the other hand, when the packet is not one that requests set-up of a session, check whether the session information of the session to which the above-described packet belongs is stored in the session information holding unit 14 (Step S705).

Then, when the relevant session information exists, update the session information, as well as abandoning the packet (Steps S703 and S704) and otherwise, abandon the above-described packet (Step S706).

When the packet with the "former sub-processing range" of each kind of match added is handed over from the traffic distribution filter 12 ("YES" at Step S707), determine whether the packet requests set-up of a session or not (Step S708).

Then, when the packet is one that requests set-up of a session, conduct abandonment processing (Step S709) and otherwise, check whether the relevant session information is stored in the session information holding unit 14 (Step S710).

When the relevant session information fails to exist, abandon the packet (Step S709) and when the same exists, update the session information, as well as abandoning the packet (Steps S711 and S712).

In addition, when a packet with the "former main processing range, sub-processing range" of each kind of match added is handed over from the traffic distribution filter 12 ("NO" at Step S707), check whether the packet is one requesting set-up of a session (Step S713).

Then, when the packet requests set-up of a session, after registering session information of the session to be set up at the information holding unit 14, abandon the packet (Steps S714 and S715).

On the other hand, when the packet is not one that requests set-up of a session, check whether relevant session information is registered in the session information holding unit 14 (Step S716).

Then, when no relevant information is registered, abandon the packet (Step S715) and when the information is registered, update the session information registered in the session information holding unit 14, as well as handing the above-described packet over to the packet forwarding unit 15 (Steps S717 and S718).

Again return to the processing shown in FIG. 6, and when a packet (with a kind of match deleted by the session processing unit 13) is handed over from the session processing unit 13, the packet forwarding unit 15 executes the packet forwarding processing (Step S58).

Figure 9:
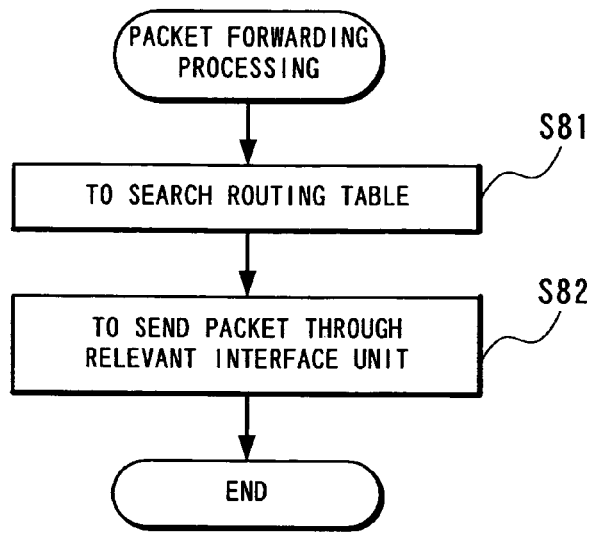
FIG. 9 is a flow chart showing one example of packet forwarding processing conducted by a packet forwarding unit 15.

In the packet forwarding processing conducted at Step S58, as shown in the flow chart of FIG. 9, obtain a sending-out path by searching the routing table 16 based on an IP destination address of a packet and send the packet through an interface unit corresponding to the obtained sending-out path (Steps S81 and S82). The packet forwarding unit 15 conducts the same processing with respect to a packet which is received through the interface units 11-1 to 11-$m$ and whose destination is not a data link multicast address.

[Advertising Message Transmission Processing]

Figure 10:
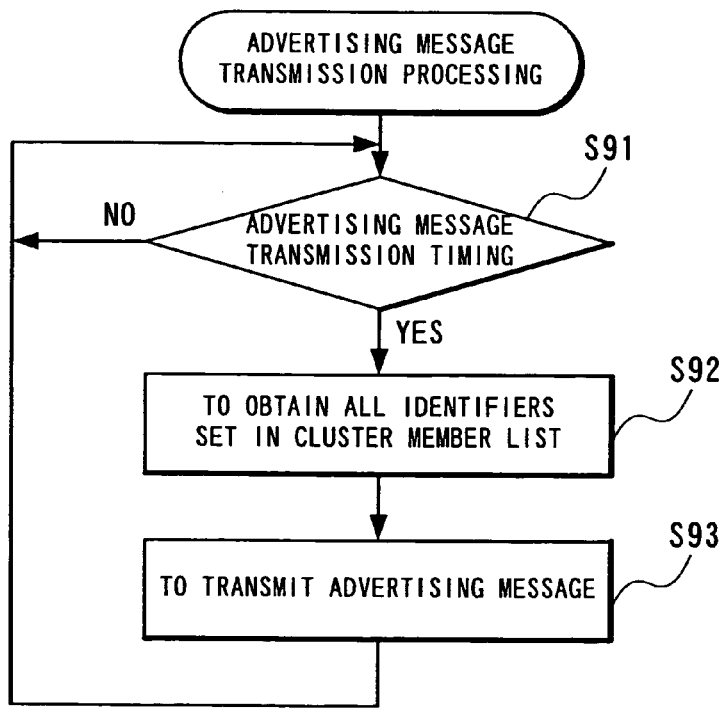
FIG. 10 is a flow chart showing one example of advertising message transmission processing conducted by an advertising message processing unit 18.

Next, transmission processing of an advertising message will be described. At every advertising message transmission timing ("YES" at Step S91), the advertising message processing unit 18 in the cluster member 1-$i$, as shown in the flow chart of FIG. 10, obtains all the identifiers stored in the cluster member list 172 (an identifier of a cluster member recognized to exist in the cluster system 1 by its own cluster member 1-$i$) and an identifier of its own cluster member 1-$i$ stored in the identifier holding unit 171 (Step S92) and transmits an advertising message containing these identifiers to other cluster member in the cluster system 1 (Step S93).

At that time, the advertising message processing unit 18 transmits the advertising message by using a predetermined multicast or broadcast address other than a cluster IP address.

At Step S91, the determination is made whether transmission timing has come or not based on whether a predetermined time Ts has elapsed after the last broadcasting message was sent, and the predetermined time Ts is set to be a time shorter than a time-out time Tout of the active/inactive monitoring timer. In other words, Ts<Tout holds. In the cluster member list 172 in a cluster member newly added to the cluster system 1, stored is only an identifier of its own cluster member.

[Advertising Message Reception Processing]

Next, advertising message reception processing will be described. Upon receiving an advertising message from other cluster member (e.g. cluster member 1-$n$) in the cluster system 1, the advertising message processing unit 18 in the cluster member 1-$i$ checks whether an identifier of the transmission source cluster member 1-$n$ contained in the advertising message is registered in the cluster member list 172 as shown in the flow chart of FIG. 11 (Step S101).

Then, when the determination is made that the identifier of the cluster member 1-$n$ is registered in the cluster member list 172 ("YES" at Step S101), reset an active/inactive monitoring timer (not shown) for the cluster member 1-$n$ provided in the active/inactive monitoring timer unit 19 and thereafter hand all the identifiers contained in the advertising message to the distribution processing control unit 17 (Steps S102 and S103).

On the other hand, when the determination is made that the identifier is not registered ("NO" at Step S101), recognize that a new cluster member is added to the cluster system 1 and output an instruction on new member addition to the distribution processing control unit 17 (Step S104).

In the new member addition instruction, the identifier of the transmission source cluster member 1-$n$ of the advertising message is contained.

Thereafter, the advertising message processing unit 18 generates an active/inactive monitoring timer for the new cluster member 1-$n$ in the active/inactive monitoring timer unit 19 (Step S105). Each active/inactive monitoring timer provided in the active/inactive monitoring timer unit 19 is designed to enter the time-out state after a lapse of the predetermined time Tout after resetting.

[Failure Recovery Processing (Failover Processing)]

Next, failure recovery processing will be described. The failure recovery unit 20 in the cluster member 1-$i$, as shown in the flow chart of FIG. 12, notes one of the active/inactive monitoring timers for the respective cluster members provided in the active/inactive monitoring timer unit 19 to check whether the active/inactive monitoring timer is at the time-out state (Steps S111 and S112).

Then, when the timer is not at the time-out state ("NO" at Step S112), note the next active/inactive monitoring timer (Step S111).

On the other hand, when the currently noted active/inactive monitoring timer (e.g. the active/inactive monitoring timer for the cluster member 1-$n$) is at the time-out state ("YES" at Step S112), determine whether its own cluster member 1-$i$ is in charge of sub-processing with the priority "1" related to traffic of which main processing is taken charge by the cluster member 1-$n$ (Step S113). The determination is made with reference to the cluster member list 172.

Then, when in charge of the sub-processing with the priority "1" ("YES" at Step S113), update the contents of the range holding unit 121 in the traffic distribution filter 12 to make its own cluster member 1-$i$ take charge of main processing also of a range of traffic of which main processing was taken charge by the cluster member 1-$n$ (Step S114).

Figure 13:
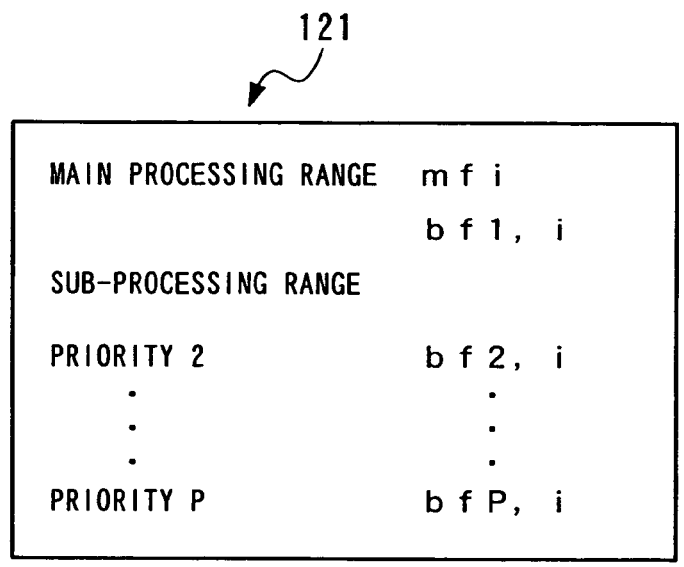
FIG. 13 is a diagram showing an example of contents of the range holding unit 121.

When the contents of the range holding unit 121 are those shown in FIG. 3, for example, update the contents to be those shown in FIG. 13. More specifically, add bf1,i to the main processing range to delete bf1,i from the sub-processing range. In FIGS. 3 and 13, bf1,i indicates the same range as the range of the main processing whose charge was taken by the cluster member 1-$n$.

On the other hand, when not in charge of the sub-processing with the priority "1" ("NO" at Step S113), determine whether among sub-processings whose charges are taken by the cluster member 1-$n$, there exists sub-processing whose traffic range is the same as that of the sub-processing whose charge is taken by its own cluster member 1-$i$ and whose priority is higher than that of the sub-processing whose charge is taken by its own cluster member 1-$i$ (Step S117).

Then, when such sub-processing exists ("YES" at Step S117), upgrade the priority of the relevant sub-processing range by one (Step S118).

Figure 14:
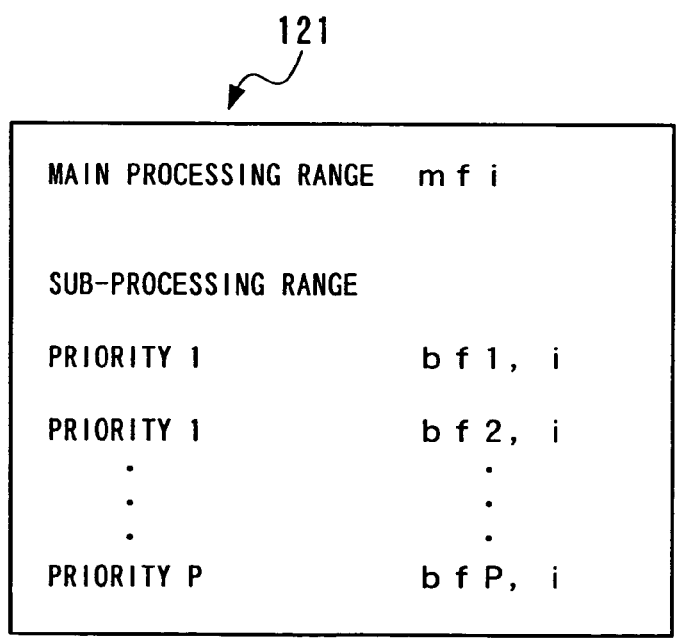
FIG. 14 is a diagram showing an example of contents of the range holding unit 121.

When the contents of the range holding unit 121 are those shown in FIG. 3, for example, update the contents to be those shown in FIG. 14. More specifically, change the priority of bf2,i from "2" to "1" (upgrade the priority by one). In FIGS. 3 and 14, bf2,1 represents the same range as a traffic range of sub-processing with the priority "1" whose charge has been taken by the cluster member 1-$n$.

On the other hand, when no sub-processing that satisfies the above-described conditions exists ("No" at Step S117), conduct the processing of Step S115. Step S115 is also executed after the completion of Step S114 or Step S118.

At Step S115, the failure recovery unit 20 notifies the distribution processing control unit 17 of time-out. The time-out notification includes an identifier of the cluster member 1-$n$ corresponding to an active/inactive monitoring timer which enters the time-out state. Thereafter, the failure recovery unit 20 deletes the active/inactive monitoring timer for the cluster member 1-$n$ from the active/inactive monitoring timer unit 19 (Step S116) to again conduct the processing of Step S111.

[New Member Addition Processing]

Next, description will be made of new member addition processing executed by the distribution processing control unit 17. Upon application of an instruction on new member addition from the advertising message processing unit 18, the distribution processing control unit 17 in the cluster member 1-$i$ conducts the processing shown in the flow chart of FIG. 15. The instruction on new member addition is assumed to include an identifier of a cluster member 1-$x$ as an identifier of a newly added cluster member.

First, the distribution processing control unit 17 determines on a main processing range and a sub-processing range of each cluster member in the cluster system 1 by using the main processing range determination rule and the sub-processing range determination rule stored in the range determination rule holding unit 173 (Step S131). More specifically, determine a main processing range and a sub-processing range of each cluster member whose identifier is stored in the cluster member list 172 and of the added cluster member 1-$x$.

Next, the distribution processing control unit 17 sorts information (an identifier, a main processing range and a sub-processing range) of each cluster member with its identifier as a key and stores the sorted information in the cluster member list 172 with numbers assigned in the sorting order (Step S132).

Thereafter, the distribution processing control unit 17 determines whether a cluster system structure recognized by its own cluster member 1-$i$ and cluster system structures recognized by other cluster members are all the same or not (Step S133).

Figure 11:
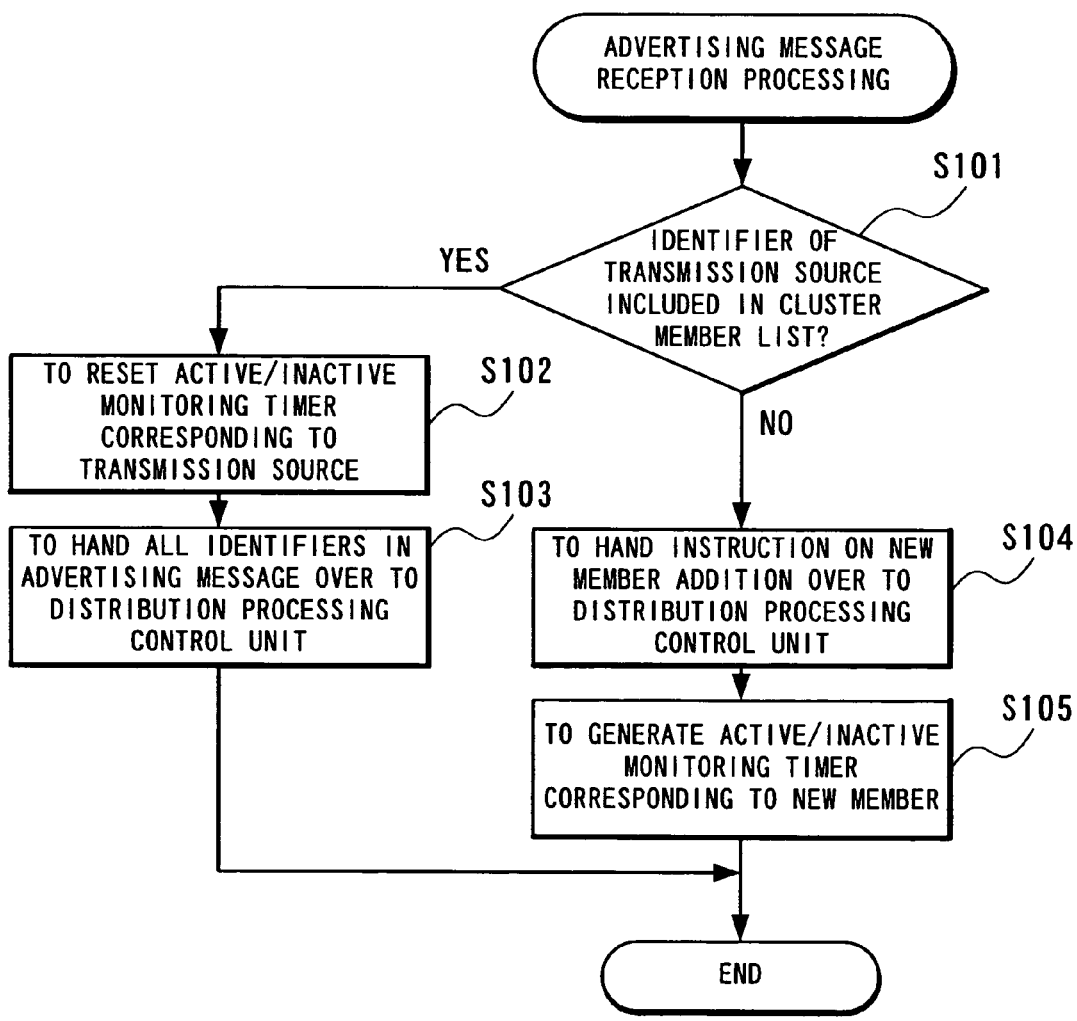
FIG. 11 is a flow chart showing one example of advertising message reception processing conducted by the advertising message processing unit 18.

The determination is made based on all the identifiers in the advertising message applied from the advertising message processing unit 18 at Step S103 in FIG. 11. More specifically, the determination that the cluster system structures recognized by all the cluster members are the same is made when with an advertising message sent from each cluster member recognized to exist in the cluster system 1 by its own cluster member 1-$i$, all the identifiers in the advertising messages sent from the above-described respective cluster members and the identifier stored in the cluster member list 172 in its own cluster member 1-$i$ coincide with each other.

Upon recognizing at Step S133 that the cluster system structures recognized by all the cluster members are the same, the distribution processing control unit 17 updates the contents of the range holding unit 121 in the traffic distribution filter 12 (Step S134). In other words, set the current main processing range and sub-processing range to be the former main processing range and the former sub-processing range, respectively, and set the main processing range and the sub-processing range determined at Step S131 to be the main processing range and the sub-processing range, respectively. When the contents of the range holding unit 121 are those shown in FIG. 3, for example, the contents will be updated as those shown in FIG. 4, for example, by conducting the processing of Step S134.

[Time-out Notification Reception Processing]

Next, description will be made of time-out notification reception processing executed by the distribution processing control unit 17. Upon application of a time-out notification from the failure recovery unit 20, the distribution processing control unit 17 conducts the processing shown in the flow chart of FIG. 16. The time-out notification is assumed to include the identifier of the cluster member 1-$n$ as an identifier of a cluster member having time-out.

First, the distribution processing control unit 17 deletes an entry of the cluster member 1-$n$ from the distribution processing control unit 17 (Step S141).

Next, based on the main processing range determination rule and the sub-processing range determination rule stored in the range determination rule holding unit 173, determine a main processing range and a sub-processing range of each cluster member whose identifier is stored in the cluster member list 172 to update the cluster member list 172 based on the determined main processing range and sub-processing range (Steps S142 and 143).

Thereafter, the distribution processing control unit 17 determines whether the cluster system structures recognized by all the cluster members are the same or not (Step S144) and when they are all the same, update the contents of the range holding unit 121 in the traffic distribution filter 12 (Step S145). At Step 145, the processing as that of Step S134 described above will be executed.

Next, operation of the present embodiment will be described with respect to a specific example.

Figure 17:
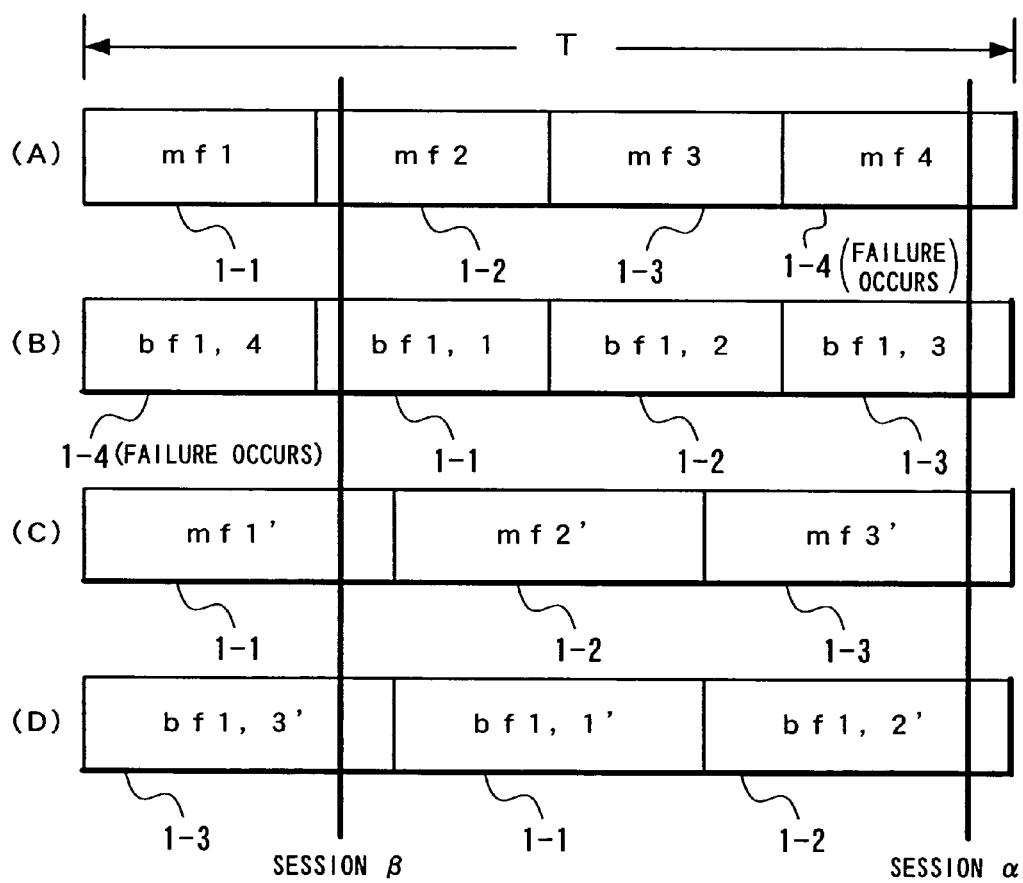
FIG. 17 is a diagram for use in explaining operation conducted when a failure occurs in a cluster member.

Assume now, for example, that the cluster system 1 is formed of four cluster members 1-1 to 1-4 and all the traffic to be processed by the cluster system 1 is represented as T. It is further assumed that at the respective cluster members 1-1 to 1-4, main processing ranges mf1 to mf4 and sub-processing ranges bf1,1 to bf1,4 shown in FIGS. 17(A) and 17(B) are set. More specifically, the cluster members 1-4, 1-1, 1-2 and 1-3 are in charge of the sub-processings with the priority "1" related to the main processings of which the cluster members 1-1, 1-2, 1-3 and 1-4 take charge. It is assumed that at this time point, neither a former main processing range nor a former sub-processing range is set.

Under such conditions, assume that a packet is multicast from the neighbor IP node (e.g. neighbor IP node 2-1) to the cluster system 1 and received by each of the cluster members 1-1 to 1-4. The packet is assumed to belong to a session α.

Because the above-described packet matches with none of the main processing range, the former main processing range, the sub-processing range and the former sub-processing range, the cluster members 1-1 and 1-2 abandon the packet (all "NO" at Step S55 in FIG. 6; S59).

Because the above-described packet matches only with the sub-processing range fb1,3, the cluster member 1-3 executes the session processing with respect to the packet ("YES" at Step S54; S56, S57).

In addition, since the packet matches with the main processing range mf4, the cluster member 1-4 executes the session processing with respect to the packet ("YES" at Step S51; S56, S57).

Assume that the cluster member 1-4 develops a failure under these conditions. Since when a failure occurs in the cluster member 1-4, no advertising message will be sent from the cluster member 1-4, the active/inactive monitoring timers for the cluster member 1-4 provided in other cluster members 1-1 to 1-3 enter the time-out state.

Figure 12:
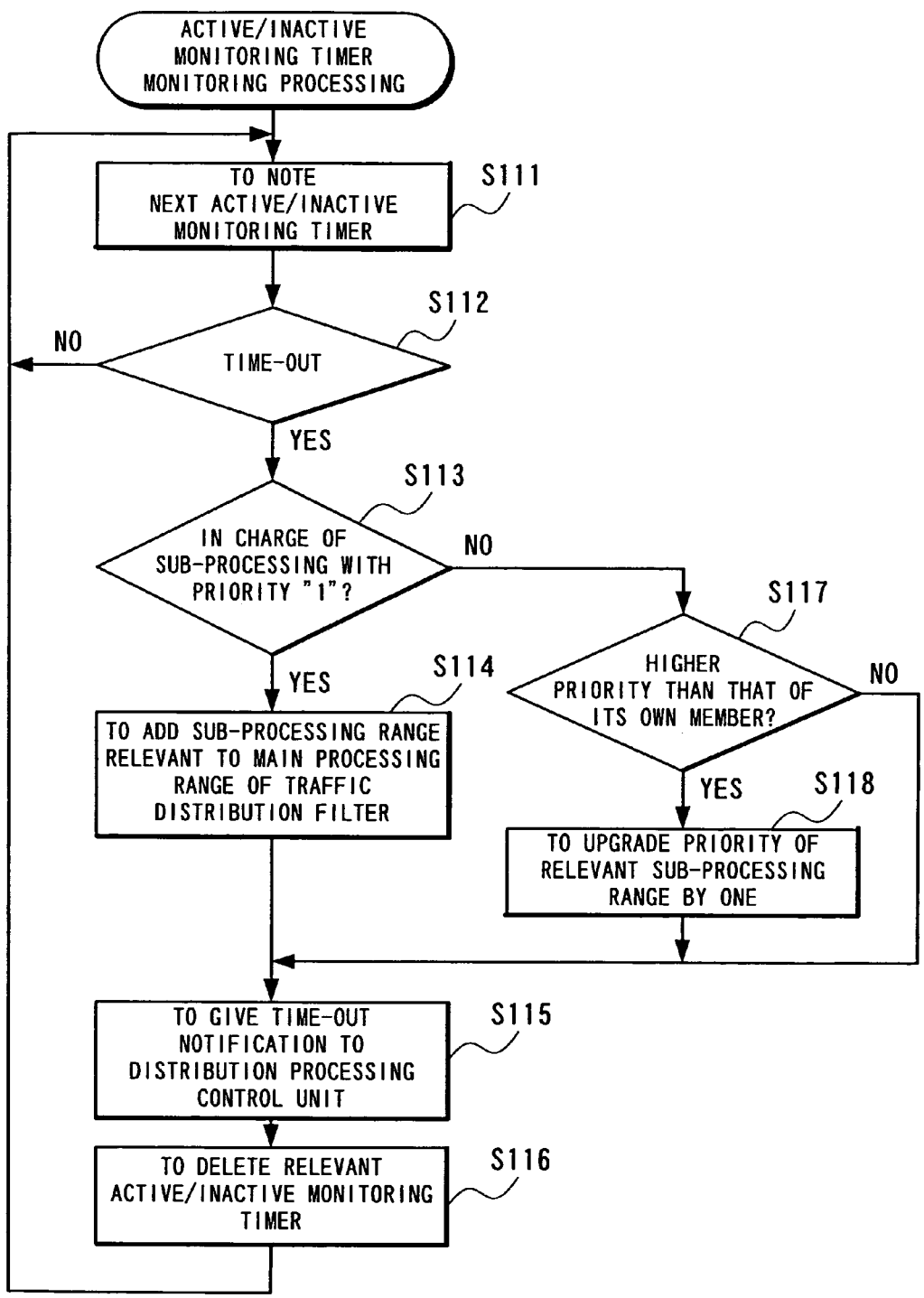
FIG. 12 is a flow chart showing one example of active/inactive monitoring timer monitoring processing conducted by a failure recovery unit 20.

When the active/inactive monitoring timers for the cluster member 1-4 enter the time-out state, the cluster member 1-3 in charge of the sub-processing with the priority "1" related to the main processing of which the cluster member 1-4 takes charge updates the range holding unit 121 in its own cluster member 1-3 to take over the main processing of which the cluster member 1-4 takes charge ("YES" at Step S112 and "YES" at Step S113 in FIG. 12; S114). In other words, since the sub-processing range bf1,3 is changed to the main processing range, the cluster member 1-3 will execute the main processing of the packet belonging to the session α.

Figure 16:
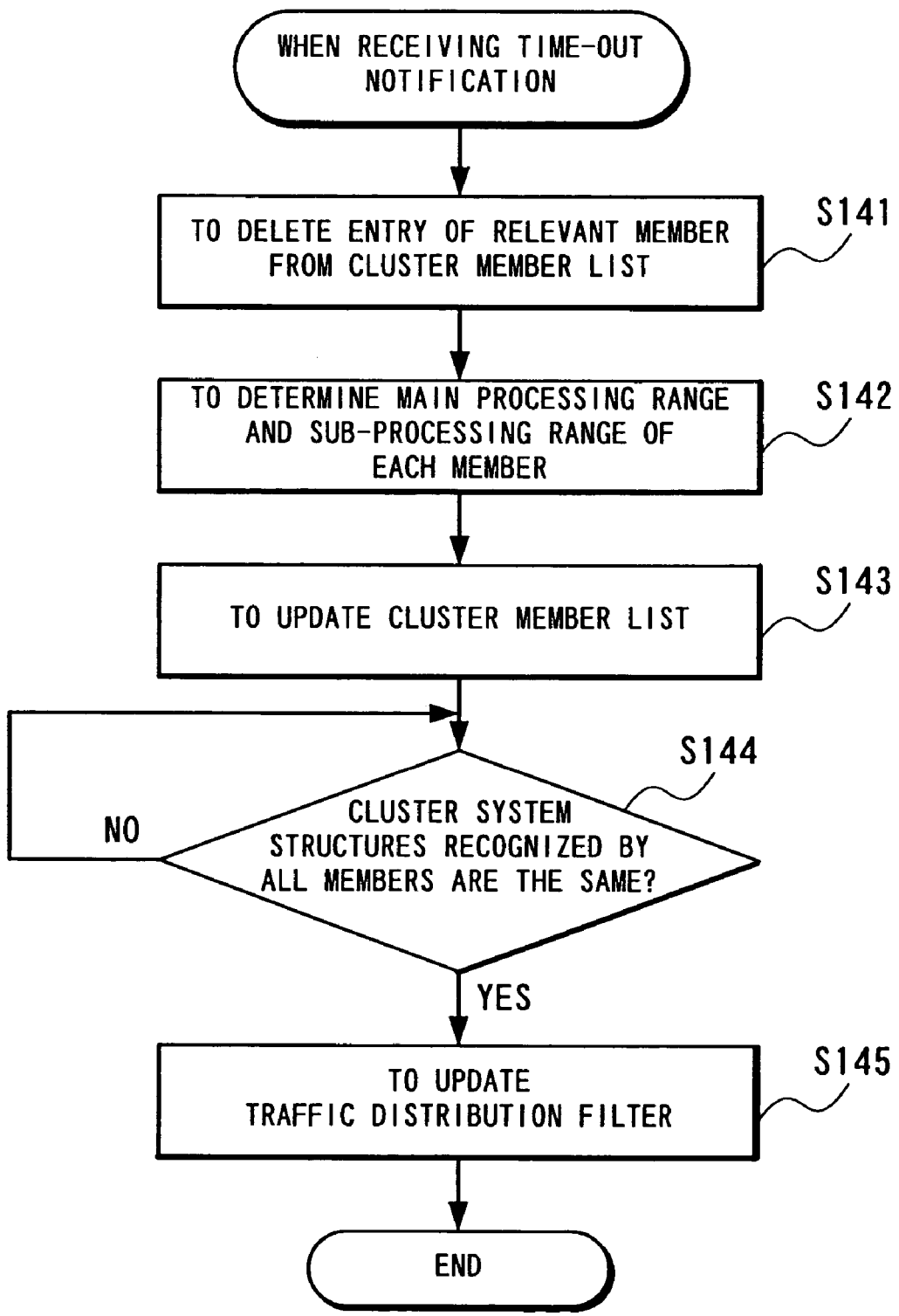
FIG. 16 is a flow chart showing an example of processing conducted when the distribution processing control unit 17 receives a time-out notification.

Thereafter, the cluster member 1-3 executes the time-out notification reception processing shown in the flow chart of FIG. 16. The other cluster members 1-1 and 1-2 will execute the time-output processing reception processing shown in the flow chart of FIG. 16 because "NO" at both Steps S113 and S117 in FIG. 12.

As a result of the execution of the reception processing shown in the flow chart of FIG. 16, in each of the cluster members 1-1 to 1-3 normally operating, the main processing ranges mf1' to mf3' and the sub-processing ranges bf1,1' to bf1,3' shown in FIGS. 17(C) and 17(D) will be set. The main processing ranges mf1 to mf3 and the sub-processing ranges bf1,1 to bf1,3 will be the former main processing ranges and the former sub-processing ranges of the cluster members 1-1 to 1-3.

Thereafter, assuming that a packet belonging to the session α is multicast from the neighbor IP node 2-a to the cluster system 1, the above-described packet is received by each of the cluster members 1-1 to 1-3.

Because the above-described packet matches with none of the main processing range, the former main processing range, the sub-processing range and the former sub-processing range, the traffic distribution filter 12 in the cluster member 1-1 abandons the packet ("NO" at Step S55 in FIG. 6; S59).

In addition, since the above-described packet is a packet which matches only with the sub-processing range bf1,2', the traffic distribution filter 12 in the cluster member 1-2 adds the "sub-processing range" of each kind of match to the packet to hand over the obtained packet to the session processing unit 13 ("YES" at Step S54 in FIG. 6; S56).

Figure 8:
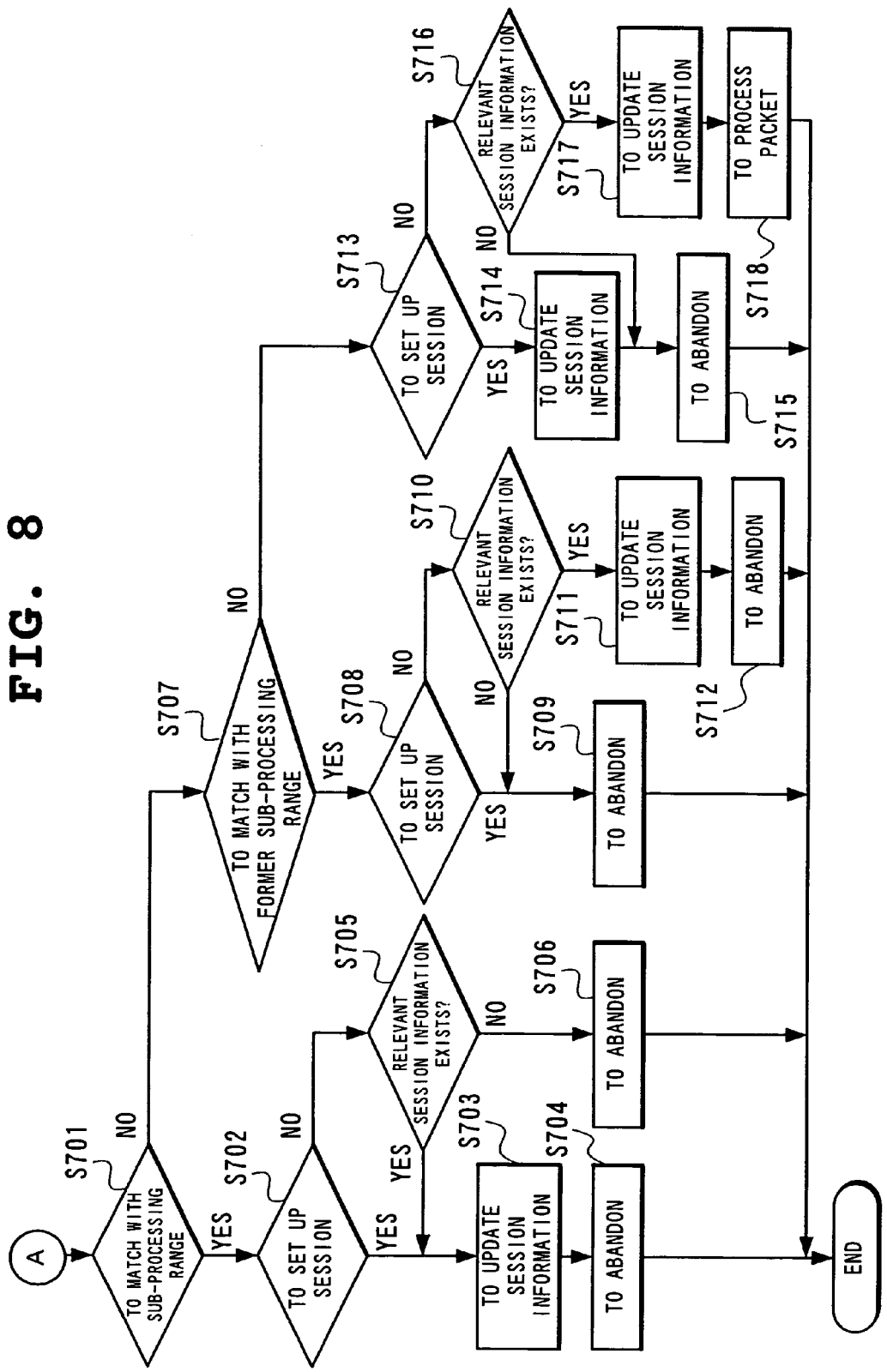
FIG. 8 is a flow chart showing one example of session processing conducted by the session processing unit 13.

When receiving the packet with the "sub-processing range" of each kind of match added, because the packet is not one that requests set-up of a session, the session processing unit 13 checks whether the session information of the above-described packet is stored in the session information holding unit 14 ("YES" at Step S701 and "NO" at Step S702 in FIG. 8; S705). In the case of this example, abandon the packet because the relevant session information is not stored ("NO" at Step S705; S706).

Since the above-described packet matches with the main processing range mf3', the traffic distribution filter 12 in the cluster member 1-3 adds the "main processing range" of each kind of match to the packet to hand over the obtained packet to the session processing unit 13 ("YES" at Step S51 in FIG. 6; S56).

Figure 7:
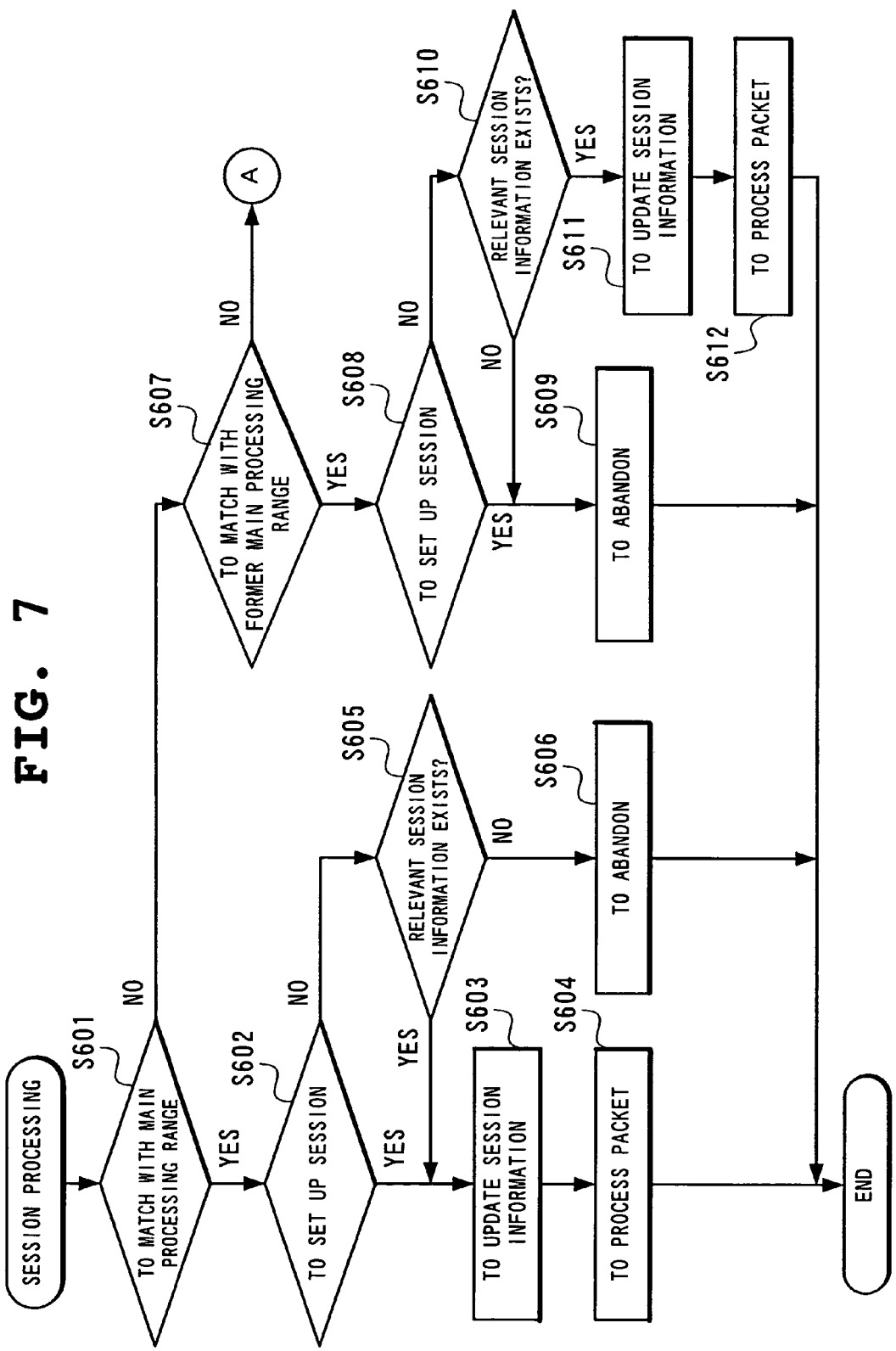
FIG. 7 is a flow chart showing one example of session processing conducted by a session processing unit 13.

Upon receiving the packet with the "main processing range" of each kind of match added, because the packet is not one that requests set-up of a session, the session processing unit 13 checks whether the session information related to the above-described packet is stored in the session information holding unit 14 ("YES" at Step S601 and "NO" at S602 in FIG. 7; S605). In the case of this example, because the cluster member 1-3 had been in charge of the sub-processing for the packet belonging to the session α before the cluster member 1-4 developed a failure, the relevant session information is supposed to exist in the session information holding unit 14.

Accordingly, the session processing unit 13 will update the relevant session information stored in the session information holding unit 14 (Step S603) and furthermore hand the above-described packet to the session processing unit 13 (Step S604).

Assume that thereafter a packet requesting set-up of a session β is multicast from the neighbor IP node 2-a to the cluster system 1. The packet is received by the respective cluster members 1-1 to 1-3 in the cluster system 1.

Since the above-described packet matches with the main processing range mf1', the traffic distribution filter 12 in the cluster member 1-1 adds the "main processing range" each kind of match to the packet to hand over the obtained packet to the session processing unit 13 ("YES" at Step S51 in FIG. 6; S56).

Upon receiving the packet with the "main processing range" of each kind of match added, because the packet is one requesting set-up of a session, the session processing unit 13 registers (new registration) session information related to the session β at the session information holding unit 14, as well as handing the packet over to the packet forwarding unit 15 ("YES" at Step S601 and "YES" at Step S602 in FIG. 7; S603, S604).

Since the above-described packet matches only with the former main processing range mf2, the traffic distribution filter 12 in the cluster member 1-2 adds the "former main processing range" of each kind of match to the packet to hand over the obtained packet to the session processing unit 13 ("YES" at S52 in FIG. 6; S56).

Upon receiving the packet with the "former main processing range" of each kind of match added, because the packet is one that requests set-up of a session, the session processing unit 13 abandons the packet ("YES" at Step S607 and "YES" at S608 in FIG. 7; S609). In other words, because the cluster member 1-1 takes charge of the main processing for the above-described packet, the cluster member 1-2 abandons the above-described packet.

Because the above-described packet matches only with the sub-processing range bf1,3', the traffic distribution filter 12 in the cluster member 1-3 adds the "sub-processing range" of each kind of match to the packet to hand over the obtained packet to the session processing unit 13 ("YES" at Step S54 in FIG. 6; S56).

Upon receiving the packet with the "sub-processing range" of each kind of match added, because the packet is one that requests set-up of a session, the session processing unit 13 registers session information related to the session β at the session information holding unit 14, as well as abandoning the packet ("YES" at Step S701 and "YES" at S702 in FIG. 8; S703 and S704).

While the foregoing is the operation conducted when the cluster member 1-4 in the cluster system 1 develops a failure, operation conducted when a new cluster member is added will be as follows.

Figure 18:
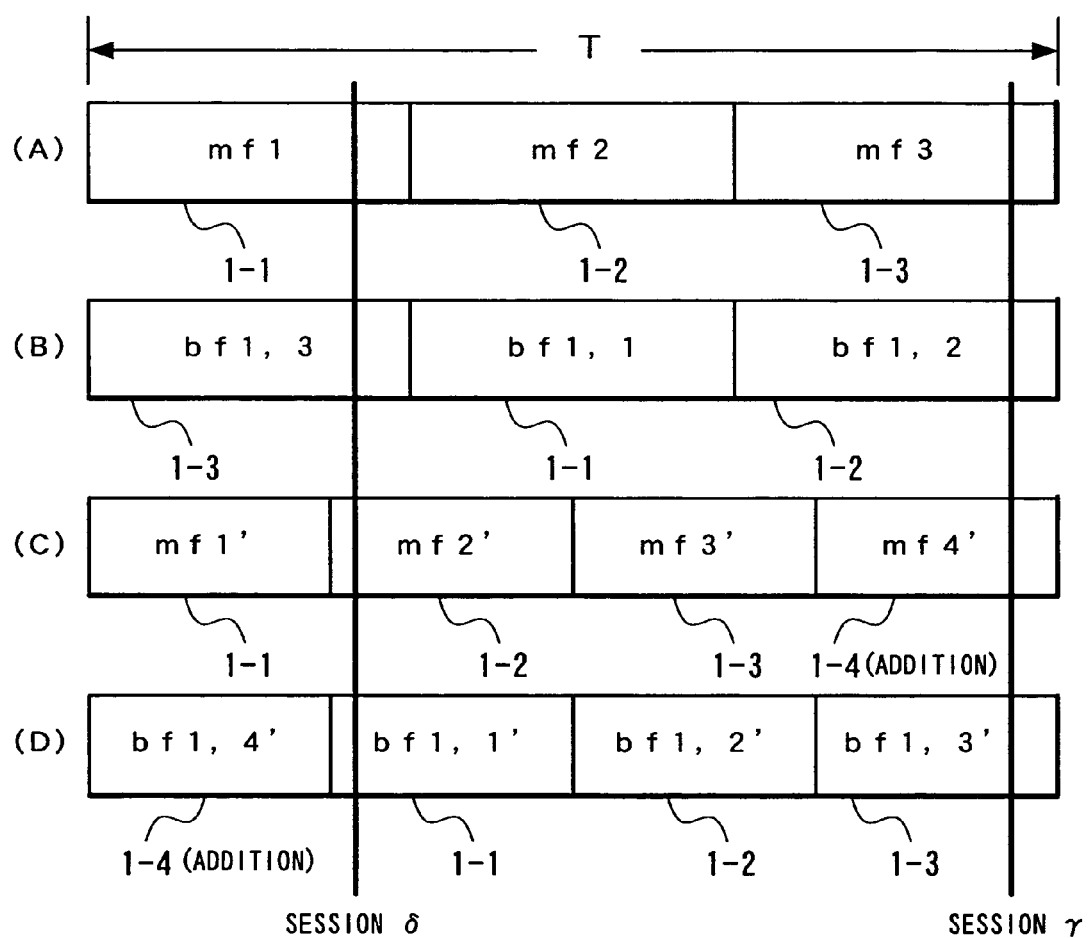
FIG. 18 is a diagram for use in explaining operation conducted when a new cluster member is added.

Assume now, for example, that the cluster system 1 is formed of three cluster members 1-1 to 1-3 and all the traffic to be processed by the cluster system 1 is represented as T. It is further assumed that at the respective cluster members 1-1 to 1-3, the main processing ranges mf1 to mf3 and the sub-processing ranges bf1,1 to bf1,3 shown in FIGS. 18(A) and 18(B) are set. In other words, the cluster members 1-3, 1-1 and 1-2 are in charge of the sub-processing with the priority "1" related to the main processing of which the cluster members 1-1, 1-2 and 1-3 take charge. It is assumed that at this time point, no former main processing range and no former sub-processing range are set.

Under such conditions, assume that a packet is multicast from the neighbor IP node (e.g. neighbor IP node 2-1) to the cluster system 1 and received by each of the cluster members 1-1 to 1-3. The packet is assumed to belong to a session γ.

Because the above-described packet matches with none of the main processing range, the former main processing range, the sub-processing range and the former sub-processing range, the cluster member 1-1 abandons the packet ("NO" at Step S55 in FIG. 6; S59).

Because the above-described packet matches only with the sub-processing range fb1,2, the cluster member 1-2 executes the session processing ("YES" at Step S54; S56, S57).

Since the packet matches with the main processing range mf3, the cluster member 1-3 executes the session processing ("YES" at Step S51; S56, S57).

Figure 15:
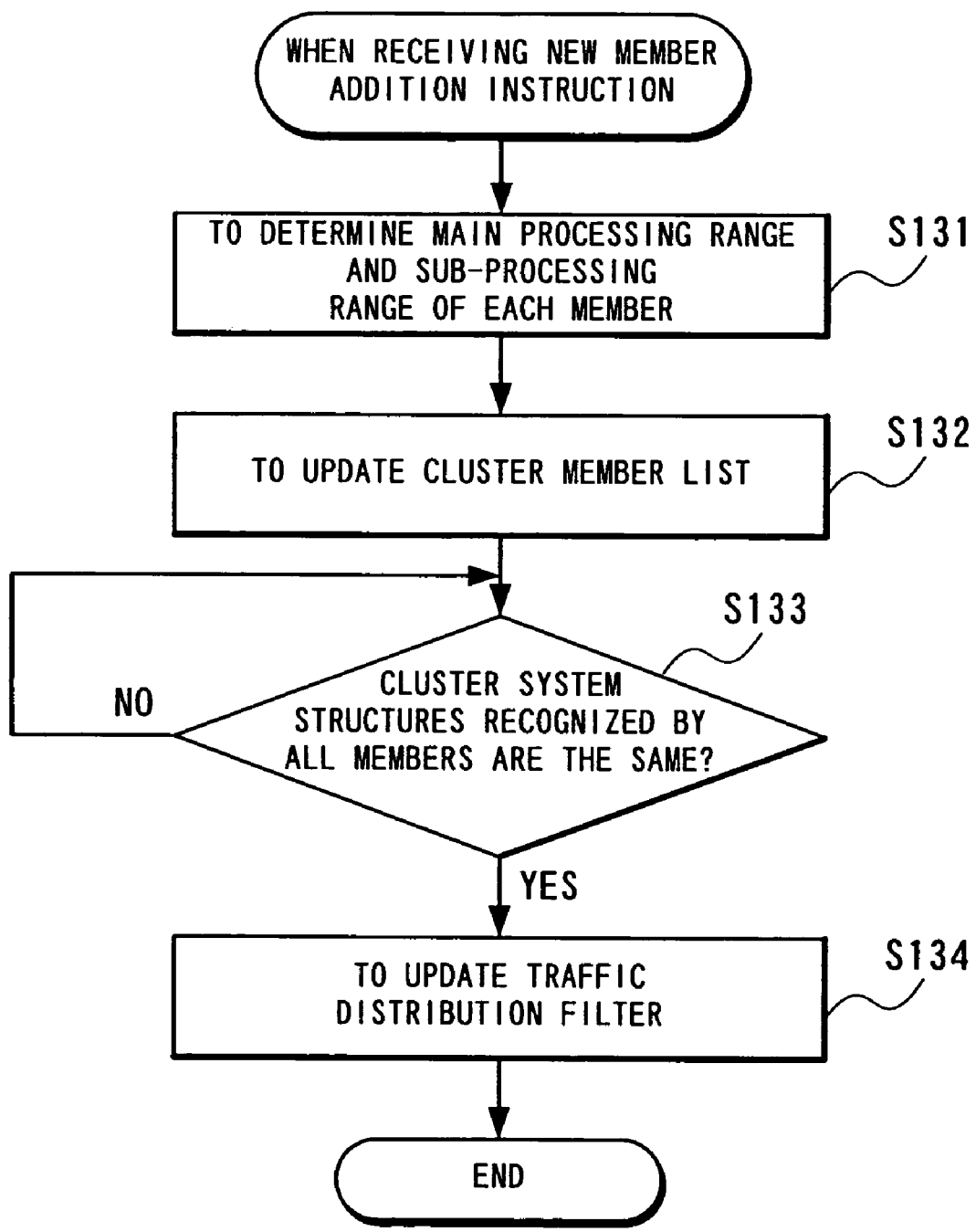
FIG. 15 is a flow chart showing an example of processing conducted when a distribution processing control unit 17 receives an instruction on new member addition.

Assuming that the cluster member 1-4 is added under these conditions, the contents of the range holding unit 121 in the cluster members 1-1 to 1-4 are updated and the main processing range, the former main processing range, the sub-processing range and the former sub-processing range whose charges are taken by the cluster members 1-1 to 1-4 are updated (Steps S131 to S134 in FIG. 15).

Assume now, for example, that the main processing ranges mf1' to mf4' and the sub-processing ranges bf1,1' to bf1,4' shown in FIGS. 18(C) and 18(D) are set at the respective cluster members 1-1 to 1-4. The main processing ranges mf1 to mf3 and the sub-processing ranges bf1,1 to bf1,3 will be the former main processing range and the former sub-processing range of the cluster members 1-1 to 1-3.

Thereafter, assuming that a packet belonging to the session γ is again multicast from the neighbor IP node 2-1 to the cluster system 1, the above-described packet is received by the respective cluster members 1-1 to 1-4.

Since the above-described packet matches with none of the main processing range, the former main processing range, the sub-processing range and the former sub-processing range, the traffic distribution filter 12 in the cluster member 1-1 abandons the packet ("NO" at Step S55 in FIG. 6; S59).

Since the packet matches only with the sub-processing range bf1,2, the traffic distribution filter 12 in the cluster member 1-2 adds the "former sub-processing range" of each kind of match to the packet to hand over the obtained packet to the session processing unit 13 ("YES" at Step S55 in FIG. 6; S56).

When receiving the packet with the "former sub-processing range" of each kind of match added, because the packet is not a packet that requests set-up of a session and the relevant session information exists in the session information holding unit 14, the session processing unit 13 abandons the packet after updating the session information ("YES" at Step S707, "NO" at Step S708 and "NO" at Step S710 in FIG. 8; S709).

Since the above-described packet matches with both the former main processing range mf3 and the sub-processing range bf1,3', the traffic distribution filter 12 in the cluster member 1-3 adds the "former main processing range and sub-processing range" of each kind of match to the packet to hand over the obtained packet to the session processing unit 13 ("YES" at S53 in FIG. 6; S56).

Upon receiving the packet with the "former main processing range and sub-processing range" of each kind of match added from the traffic distribution filter 12, because the packet is not one that requests set-up of a session and the relevant session information exists in the session information holding unit 14, the session processing unit 13 updates the session information and then hands the above-described packet over to the packet forwarding unit 15 ("NO" at Step S713 and "YES" at S716 in FIG. 8; S717, S718).

Since the above-described packet matches with the main processing range mf4', the traffic distribution filter 12 in the cluster member 1-4 adds the "main processing range" of each kind of match to the packet to hand over the obtained packet to the session processing unit 13 ("YES" at Step S51 in FIG. 6; S56).

Upon receiving the packet with the "main processing range" of each kind of match added, because the packet is not one that requests set-up of a session and there exists no relevant session information in the session information holding unit 14, the session processing unit 13 abandons the packet ("YES" at Step S601, "NO" at Step S602 and "NO" at S605 in FIG. 7; S606).

Thereafter, assuming that the neighbor IP node 2-1 multicasts a packet requesting set-up of a session δ to the cluster system 1, the packet is received by each of the cluster members 1-1 to 1-4.

Since the above-described packet matches with both the former main processing range mf1 and the sub-processing range bf1,1', the traffic distribution filter 12 in the cluster member 1-1 adds the "former main processing range and sub-processing range" of each kind of match to the packet to hand over the obtained packet to the session processing unit 13 ("YES" at S53 in FIG. 6; S56).

Upon receiving the packet with the "former main processing range and sub-processing range" of each kind of match added, because the packet is one that requests set-up of a session, the session processing unit 13 updates the session information (registers the session information of the session δ at the session information holding unit 14) and then abandons the packet ("YES" at Step S713 in FIG. 8; S714, S715).

Because the above-described packet matches with the main processing range mf2', the traffic distribution filter 12 in the cluster member 1-2 adds the "main processing range" of each kind of match to the packet to hand over the obtained packet to the session processing unit 13 ("YES" at Step S51 in FIG. 6; S56).

Upon receiving the packet with the "main processing range" of each kind of match added, because the packet is one that requests set-up of the session δ, the session processing unit 13 registers the session information at the session information holding unit 14 (newly registers the session information of the session δ), as well as handing over the above-described packet to the packet forwarding unit 15 ("YES" at both Steps S601 and S602 in FIG. 7; S603 and S604).

Since the above-described packet matches only with the former sub-processing range, the traffic distribution filter 12 in the cluster member 1-3 adds the "former sub-processing range" of each kind of match to the packet and hands the obtained packet over to the session processing unit 13 ("YES" at Step S55 in FIG. 6; S56).

Since the above-described packet is one that requests set-up of the session δ, the traffic processing unit 13 abandons the packet ("YES" at Steps S707 and S708 in FIG. 8; S709).

Since the above-described packet matches none of the main processing range, the former main processing range, the sub-processing range and the former sub-processing range, the traffic distribution filter 12 in the cluster member 1-4 abandons the packet ("NO" at Step S55 in FIG. 6; S59).

Although not described in the foregoing, among the former main processing ranges and the former sub-processing ranges stored in the range holding unit 121 in the traffic distribution filter 12, each cluster member may delete a former main processing range and a former sub-processing range having no related session (a session whose set-up processing has been conducted in its own cluster member). In other words, such arrangement as described above is employed because a former main processing range and a former sub-processing range are effective only when there exists a related session in the ranges and they become useless unless a related session exists. This arrangement reduces the number of processing ranges to be compared by the traffic distribution filter 12 to increase a processing rate.

Other Embodiment of the Present Invention

In the above-described embodiment, when a cluster member conducting main processing develops a failure, a cluster member conducting sub-processing switches the sub-processing in question to the main processing and conducts the main processing in addition to its own main processing (failover processing). When a traffic processing range is re-divided to eliminate a session being processed, loads on the respective members are again averaged, while after the failover, the processing will be centralized on a specific cluster member in a short span.

The present embodiment reduces unfair processing load centralization after failover by minutely defining division of a traffic range of which each cluster member takes charge by the following manner.

More specifically, when the number of cluster members is n, divide the entire traffic into n (n−1). Each cluster member takes charge of a number (n−1) divisions as main processing. In addition, each cluster member takes charge of a number (n−1) of divisions whose main processing is taken charge of by one of other cluster members. The divisions are designed to be all taken from ranges whose main processings are taken charge of by different cluster members.

More specifically, assuming that with respect to certain sub-processing, $bfi,k$ is the k-th sub-processing conducted by the cluster member $1\text{-}i$, the following expression holds:

$$bfi = bfi,1 \cup bfi,2 \cup \ldots \cup bfi,(n-1)$$

Here, determine the sub-processing range $bfi$ of the cluster member $1\text{-}i$ such that the following expression holds:

$$mfj \cap bfi,k = \phi (k \neq j)$$

$$bf1,i \cup \ldots \cup bf(i-1),i \cup bf(i+1),i \cup \ldots \cup bfn,i = mfi.$$

Figure 19:
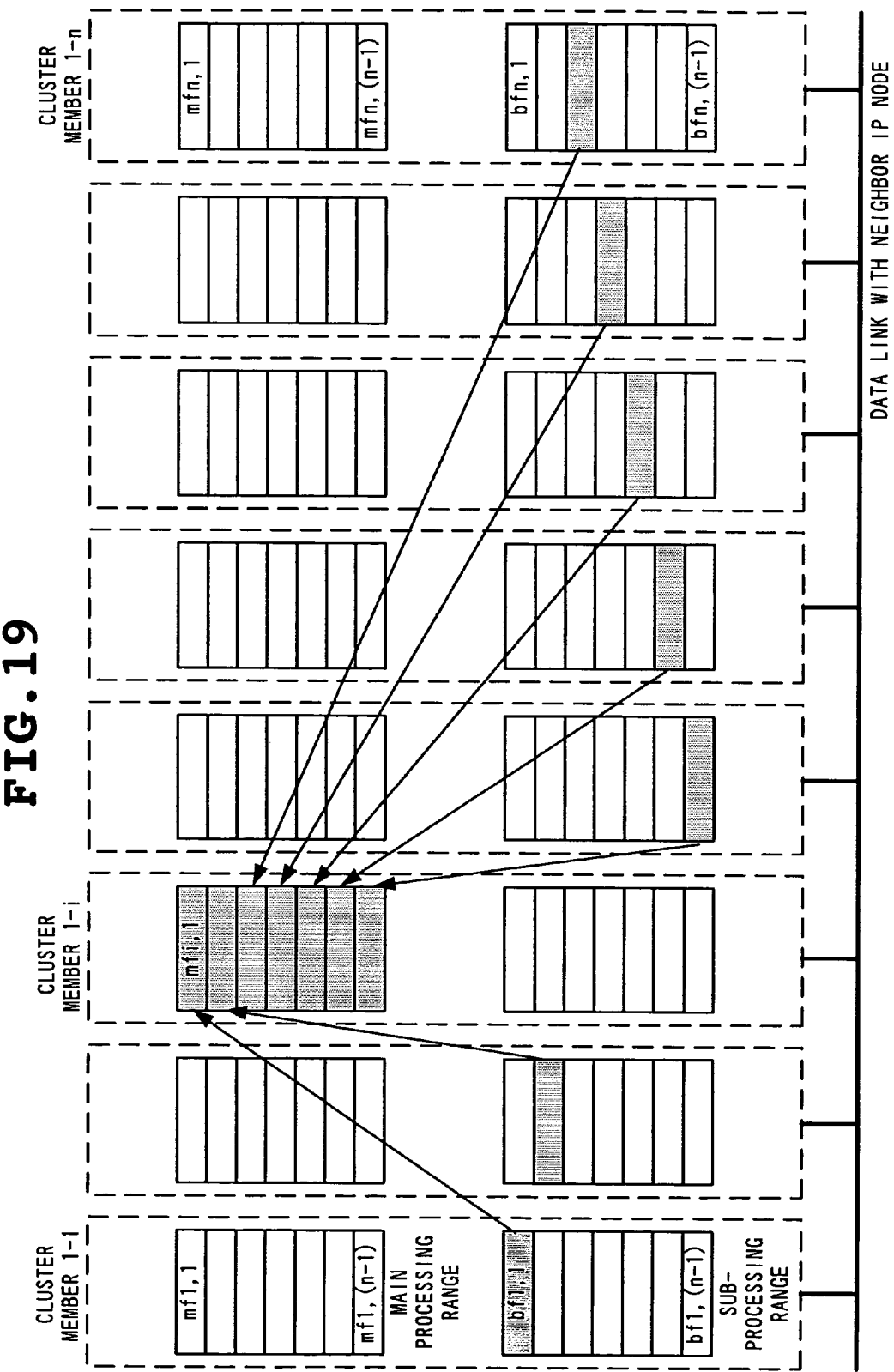
FIG. 19 is a diagram for use in explaining other embodiment of the present invention.
Figure 20:
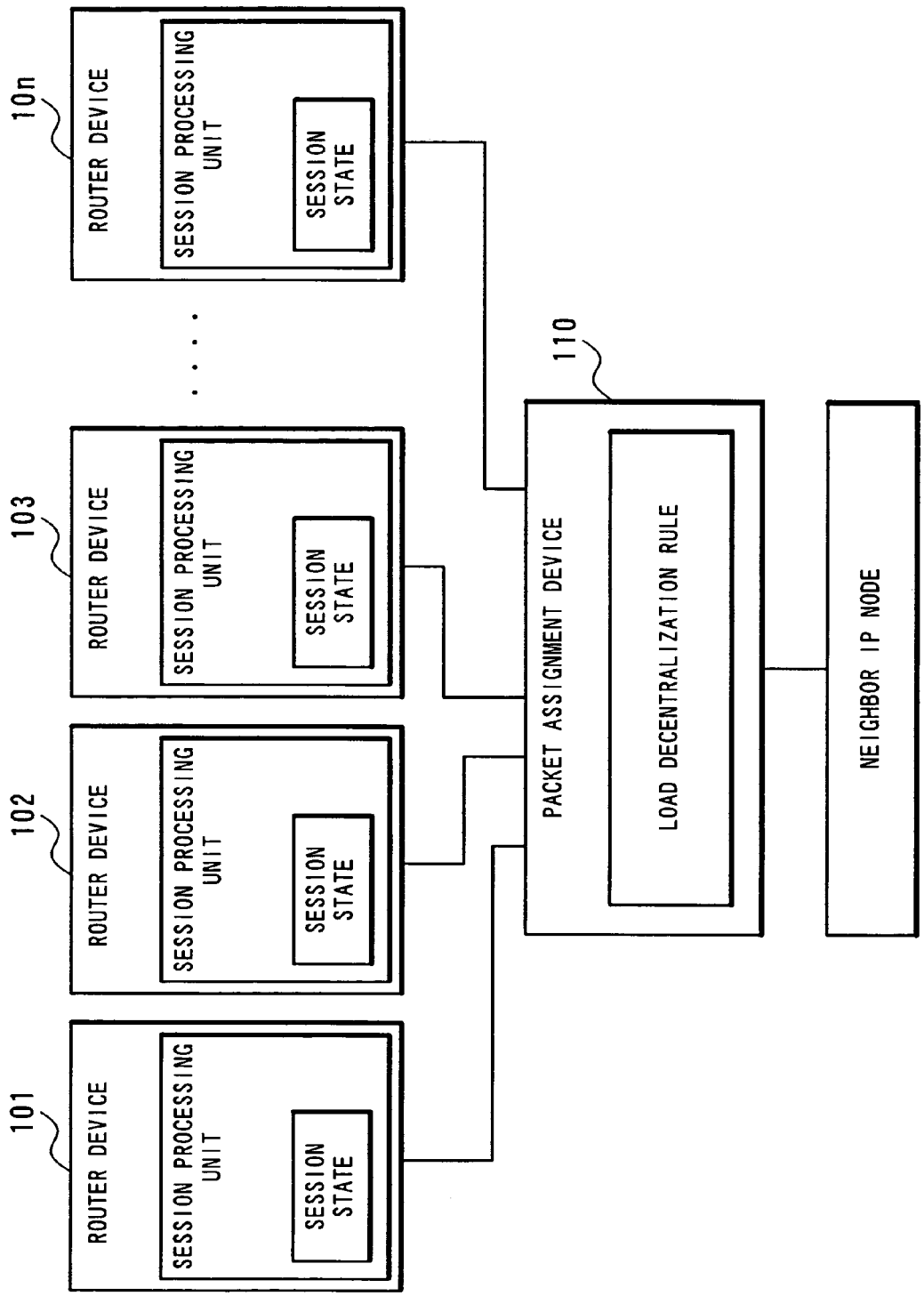
FIG. 20 is a block diagram for use in explaining conventional art.
Figure 21:
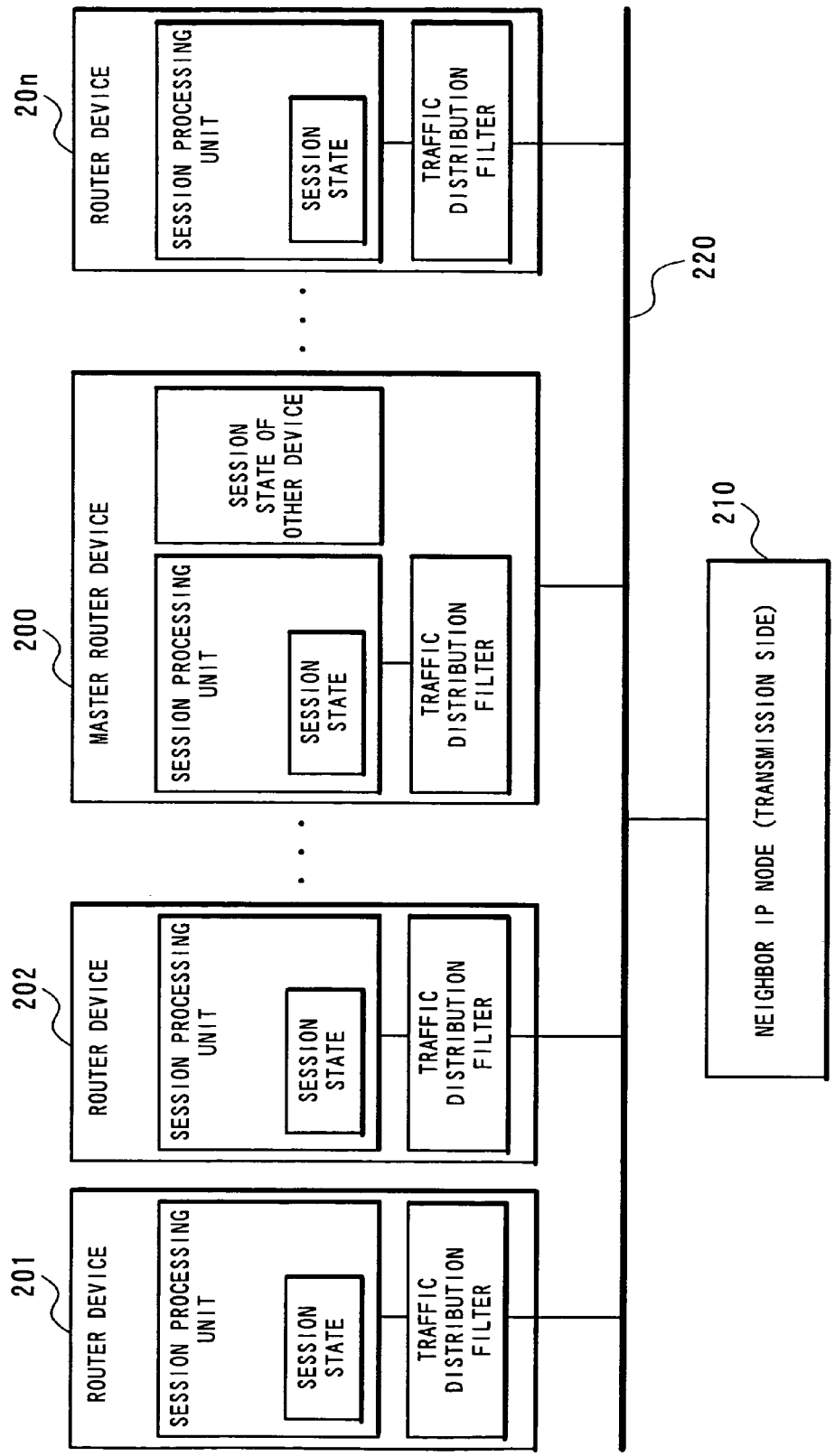
FIG. 21 is a block diagram for use in explaining another conventional art.

Example of assignment is shown in FIG. 19.

Assuming here that a certain cluster member $1\text{-}i$ develops a failure, since among sub-processings of other cluster members, only a part relevant to the main processing of the cluster member $1\text{-}i$ will be switched to the main processing, so that no main processing of a specific member will be unfairly increased, thereby evenly decentralizing loads to all the members.

In addition, although not described in the foregoing embodiments, the same effect can be obtained by replacing the functions of path control and packet forwarding that the cluster members have with that of a L3 switch.

The foregoing described first to fifth cluster systems, first cluster member, first failure recovery method and first program according to the present invention enable failure recovery processing without exchanging session information among cluster members. As a result, as compared with conventional art in which session information is exchanged among cluster members, failure recovery processing can be more rapidly executed, while scalability can be increased. The reason is that a cluster member in charge of sub-processing executes session information recording and updating processing and when a cluster member in charge of the main processing develops a failure, the cluster member in charge of the sub-processing takes over the processing by using session information recorded in its own cluster member.

Moreover, the third cluster system according to the present invention enables a main processing range or a sub-processing range of which each cluster member takes charge to be changed when a cluster member develops a failure or at the time of new cluster member addition even without exchanging session information among the cluster members. The reason is that each cluster member determines new main processing range and sub-processing range based on range determination rules to make a main processing range and a sub-processing range used so far be a former main processing range and a former sub-processing range.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A cluster system formed of a plurality of cluster members, wherein each said cluster member,
   with respect to a packet included in a main processing range indicative of a range of main processing assigned to said cluster member or a sub-processing range indicative of a range of sub-processing among packets applied to said cluster system, executes session processing including processing of recording and updating session information indicative of a state of a session of said packet, and
   when a cluster member in charge of main processing of a packet whose sub-processing is assigned to the cluster member in question develops a failure, takes over the main processing of the packet of said cluster member under failure by using said recorded session information.

2. The cluster system as set forth in claim 1, wherein
   said main processing range and said sub-processing range are determined according to a predetermined range determination rule, and
   among the packets applied to said cluster system, with respect to a packet matching with said main processing range, said session processing and packet forwarding processing are conducted and with respect to a packet matching with said sub-processing range, said session processing is conducted.

3. A cluster system formed of a plurality of cluster members,
   each said cluster member comprising:
   a traffic distribution filter which passes, among packets applied to said cluster system, a packet included in a main processing range indicative of a range of main processing assigned to the cluster member in question or a sub-processing range indicative of a range of sub-processing;
   a session information holding unit in which session information indicative of a state of a session of said packet is stored;
   a session processing unit which executes, with respect to a packet included in said main processing range or said sub-processing range among packets passing through said traffic distribution filter, session processing including processing of updating session information of said packet stored in said session information holding unit;
   a packet forwarding unit which conducts processing of forwarding a packet output from the session processing unit; and
   a failure recovery unit which, when a cluster member in charge of main processing of a packet whose sub-processing is assigned to by the cluster member in question develops a failure, changes said sub-processing range to a main processing range.

4. The cluster system as set forth in claim 3, comprising:

a distribution processing control unit which determines a main processing range indicative of a range of main processing of which the cluster member in question is in charge and a sub-processing range indicative of a range of sub-processing based on a predetermined range determination rule and the number of cluster members forming said cluster system, wherein said session processing unit, with respect to a packet matching with said main processing range among packets applied to said cluster system, executes session processing including processing of updating session information of said packet stored in said session information holding unit, as well as executing packet output processing and with respect to a packet matching with said sub-processing range, executes session processing including processing of updating session information of said packet stored in said session information holding unit, as well as executing packet abandonment processing.

5. The cluster system as set forth in claim 4, wherein said distribution processing control unit, when other cluster member develops a failure and when a new cluster member is added to the cluster system, determines new main processing range and sub-processing range based on said range determination rule and the number of cluster members to make the main processing range and the sub-processing range used so far be a former main processing range and a former sub-processing range, said traffic distribution filter passes, among packets applied to said cluster system, a packet matching with said new main processing range, said new sub-processing range, said former main processing range or said former sub-processing range, and said session processing unit, among packets passing through said traffic distribution filter, with respect to a packet matching with said new main processing range, on condition that the packet is a packet which requests set-up of a session or that session information of said packet is stored in said session information holding unit, executes session processing including processing of updating the session information of said packet stored in said session information holding unit, as well as executing packet output processing, with respect to a packet matching only with said former main processing range, abandons the packet when the packet is a packet which requests set-up of a session and otherwise, on condition that session information of said packet is stored in said session information holding unit, executes session processing including processing of updating the session information of said packet stored in said session information holding unit, as well as executing packet output processing, with respect to a packet matching only with said new sub-processing range, on condition that the packet is a packet which requests set-up of a session or that session information of said packet is stored in said session information holding unit, executes session processing including processing of updating the session information of said packet stored in said session information holding unit, as well as executing packet abandonment processing, and with respect to a packet matching only with said former sub-processing range, abandons the packet when the packet is a packet which requests set-up of a session and otherwise, on condition that session information of said packet is stored in said session information holding unit, executes session processing including processing of updating the session information of said packet stored in said session information holding unit, as well as executing packet abandonment processing.

6. The cluster system as set forth in claim 5, wherein among packets passing through said traffic distribution filter, with respect to a packet matching with both said former sub-processing range and said sub-processing range, when the packet is a packet which requests set-up of a session, said session processing unit executes session processing including processing of updating session information of said packet stored in said session information holding unit, as well as executing packet abandonment processing and otherwise, on condition that the session information of said packet is stored in said session information holding unit, executes session processing including processing of updating the session information of said packet stored in said session information holding unit, as well as executing packet output processing.

7. The cluster system as set forth in claim 3, each said cluster member comprising:

a cluster member list in which an identifier of a cluster member in said cluster system is stored;

an active/inactive monitoring timer for each cluster member; and an advertising message processing unit which transmits an advertising message containing an identifier of the cluster member in question to other cluster member at predetermined intervals and when receiving an advertising message from other cluster member, resets the active/inactive monitoring timer corresponding to a cluster member as a transmission source of the advertising message; and said distribution processing control unit, when time-out occurs in any of the active/inactive monitoring timers, recognizes that a cluster member corresponding to the time-out active/inactive monitoring timer develops a failure.

8. The cluster system as set forth in claim 7, wherein when an identifier in an advertising message received by said advertising message processing unit is not contained in said cluster member list, said distribution processing control unit recognizes that the cluster member of said identifier is added.

9. A cluster member which, among packets applied to a cluster system having the cluster member in question as a component, a packet included in a main processing range indicative of a range of main processing assigned to said cluster member in question or a sub-processing range indicative of a range of sub-processing, executes session processing including processing of recording and updating session information indicative of a state of a session of said packet, and when a cluster member in charge of main processing of a packet whose sub-processing is assigned to by the cluster member in question develops a failure, takes over the main processing of the packet of said cluster member under failure by using said recorded session information.

10. The cluster member as set forth in claim 9, which determines said main processing range and said sub-processing range according to a predetermined range determination rule, and among the packets applied to said cluster system, with respect to a packet matching with said main processing range, conducts said session processing and packet forwarding processing and with respect to a packet matching with said sub-processing range, conducts said session processing.

11. A failure recovery method of a cluster system formed of a plurality of cluster members, wherein each said cluster member, among packets applied to said cluster system, with respect to a packet included in a main processing range indicative of a range of main processing assigned to said cluster member or a sub-processing range indicative of a range of sub-processing, executes session processing including processing of recording and updating session information indicative of a state of a session of said packet, and when a cluster member in charge of main processing of a packet whose sub-processing is assigned to by the cluster member in question develops a failure, takes over the main processing of the packet of said cluster member under failure by using said recorded session information.

12. The failure recovery method as set forth in claim 11, wherein said main processing range indicative of a range of main processing of which the cluster member in question is in charge and said sub-processing range indicative of a range of sub-processing are determined based on a predetermined range determination rule, among packets applied to said cluster system, with respect to a packet matching with said main processing range, executes session processing including processing of recording and updating session information indicative of a state of a session to which the packet belongs and packet forwarding processing, and with respect to a packet matching with said determined sub-processing range, executes session processing including processing of recording and updating session information indicative of a state of a session to which the packet belongs.

13. A computer-readable medium incorporating a program of instructions operable to control a computer to function as a cluster member of a cluster system, the program of instructions comprising:

instructions to control said computer, among packets applied to the cluster system, with respect to a packet matching with a main processing range indicative of a range of main processing of which the cluster member in question takes charge or with a sub-processing range indicative of a range of sub-processing, to execute session processing including processing of recording and updating session information indicative of a state of a session to which the packet belongs, and instructions to control said computer, when a cluster member in charge of main processing of a packet whose sub-processing is taken charge of by the cluster member in question develops a failure, to take over the main processing of the packet of which said cluster member developing a failure takes charge by using said recorded session information.

14. The computer-readable medium as set forth in claim 13, wherein the program further comprises:

instructions operable to control said computer to determine said main processing range indicative of a range of main processing of which the cluster member in question is in charge and said sub-processing range indicative of a range of sub-processing based on a predetermined range determination rule, among packets applied to said cluster system, with respect to a packet matching with said main processing range, to execute session processing including processing of recording and updating session information indicative of a state of a session to which the packet belongs and packet forwarding processing, and instructions operable to control said computer, with respect to a packet matching with said determined sub-processing range, to execute session processing including processing of recording and updating session information indicative of a state of a session to which the packet belongs.

* * * * *